United States Patent
Sonoda et al.

(10) Patent No.: US 10,652,417 B2
(45) Date of Patent: May 12, 2020

(54) IMAGE PROCESSING APPARATUS WITH WARNING STATE DETECTION SERVER, AND PROGRAM

(71) Applicant: KONICA MINOLTA, INC., Chiyoda-ku, Tokyo (JP)

(72) Inventors: Yu Sonoda, Toyokawa (JP); Akito Ota, Toyokawa (JP); Eisaku Owada, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/286,104

(22) Filed: Feb. 26, 2019

(65) Prior Publication Data

US 2019/0297214 A1  Sep. 26, 2019

(30) Foreign Application Priority Data

Mar. 20, 2018 (JP) ................................. 2018-052025

(51) Int. Cl.
*G06K 15/00* (2006.01)
*H04N 1/00* (2006.01)

(52) U.S. Cl.
CPC ..... *H04N 1/00915* (2013.01); *H04N 1/00037* (2013.01); *H04N 1/00079* (2013.01); *H04N 1/00244* (2013.01); *H04N 1/00323* (2013.01); *H04N 1/00925* (2013.01); *H04N 2201/0094* (2013.01)

(58) Field of Classification Search
None
See application file for complete search history.

(56) References Cited

U.S. PATENT DOCUMENTS

| 2008/0071941 A1* | 3/2008 | Imai | H04L 43/0817 710/19 |
| 2009/0273808 A1* | 11/2009 | Kohli | H04N 1/00222 358/1.15 |
| 2019/0065125 A1* | 2/2019 | Genda | G06F 3/121 |
| 2019/0095148 A1* | 3/2019 | Celinder | G06F 3/1285 |

FOREIGN PATENT DOCUMENTS

JP  H05167764 A  7/1993

* cited by examiner

*Primary Examiner* — Henok Shiferaw
(74) *Attorney, Agent, or Firm* — Buchanan Ingersoll & Rooney PC

(57) ABSTRACT

There is provided an image processing apparatus that transmits data relating to an internal component to a server, and the image processing apparatus includes a hardware processor that: acquires from the server a failure prediction list in which a plurality of image processing apparatuses is ranked; detects that the internal component has reached a warning state; specifies a data transmission stop apparatus that is to be caused to stop data transmission to the server from among other image processing apparatuses by referring the failure prediction list in a case where it is detected that the internal component has reached the warning state; transmits a stop command for causing the data transmission to the server to be stopped to the data transmission stop apparatus specified; and transmits, to the server, data relating to the internal component detected as being in the warning state.

17 Claims, 17 Drawing Sheets

| APPARATUS NAME | ADDRESS | COMPONENT RANK | | | | OVERALL RANK |
|---|---|---|---|---|---|---|
| | | COMPONENT A | COMPONENT B | ... | COMPONENT N | |
| MFP-A | ###.###.###.### | 3 | 1 | ... | 3 | 3 |
| MFP-B | ###.###.###.### | 2 | 5 | ... | 4 | 5 |
| MFP-C | ###.###.###.### | 4 | 2 | ... | 2 | 4 |
| ... | ... | ... | ... | ... | ... | ... |
| MFP-N | ###.###.###.### | 1 | 1 | ... | 1 | 1 |

| COMPONENT NAME | IMPORTANCE |
|---|---|
| PHOTOSENSITIVE DRUM | HIGH |
| INTERMEDIATE TRANSFER BELT | HIGH |
| FIXING UNIT | HIGH |
| ⋮ | ⋮ |
| CONVEYING ROLLER | MEDIUM |
| ⋮ | ⋮ |
| TONER (Y) | LOW |
| TONER (M) | LOW |
| TONER (C) | LOW |
| TONER (K) | LOW |
| ⋮ | ⋮ |

IMAGE PROCESSING APPARATUS WITH WARNING STATE DETECTION SERVER, AND PROGRAM

The entire disclosure of Japanese patent Application No. 2018-052025, filed on Mar. 20, 2018, is incorporated herein by reference in its entirety.

BACKGROUND

Technological Field

The present invention relates to an image processing apparatus, a server, and a program, and more particularly to a technique in which an image processing apparatus transmits data to a server.

Description of the Related Art

Image processing apparatuses such as multifunction peripherals (MFPs) are installed around the world. In such an image processing apparatus, various components are mounted that operate during execution of a job. When a failure occurs in those components or their lifetime expire, it becomes impossible for the image processing apparatus to execute the job normally. For that reason, the image processing apparatus is equipped with various sensors and counters for monitoring operation states and the like of those components.

Conventionally, as a system for performing remote diagnosis of this kind of image processing apparatus, a system is known in which a plurality of image processing apparatuses and a central diagnosis apparatus are connected to each other via a central management apparatus, and the central diagnosis apparatus collects data transmitted from each of the plurality of image processing apparatuses via the central management apparatus and performs diagnosis (for example, JP H5-167764 A). In this conventional technique, each of the plurality of image processing apparatuses performs failure prediction by analyzing data obtained from the apparatus main body, and decides a transfer timing of data, based on a result of the failure prediction. The central management apparatus decides order of accepting diagnostic data in descending order of the diagnostic rank level, based on a result of the failure prediction in each image processing apparatus.

However, in the above-described conventional technique, when deciding the transfer timing of the data, each image processing apparatus decides the transfer timing without considering a situation of another image processing apparatus. For that reason, in the conventional technique, there is a possibility that the plurality of image processing apparatuses starts data transfer simultaneously. When the plurality of image processing apparatuses starts data transfer simultaneously, a load increases on a server side such as the central management apparatus, and there is a possibility that the system may go down, which is a problem.

SUMMARY

The present invention has been made to solve the above problems, and it is an object to provide an image processing apparatus, a server, and a program capable of effectively reducing the load on the server.

To achieve the abovementioned object, according to an aspect of the present invention, there is provided an image processing apparatus that transmits data relating to an internal component to a server, and the image processing apparatus reflecting one aspect of the present invention comprises a hardware processor that: acquires from the server a failure prediction list in which a plurality of image processing apparatuses is ranked; detects that the internal component has reached a warning state; specifies a data transmission stop apparatus that is to be caused to stop data transmission to the server from among other image processing apparatuses by referring the failure prediction list in a case where it is detected that the internal component has reached the warning state; transmits a stop command for causing the data transmission to the server to be stopped to the data transmission stop apparatus specified; and transmits, to the server, data relating to the internal component detected as being in the warning state.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a diagram illustrating an example of a failure prediction list;

FIG. 14 is a diagram illustrating an example of component importance information;

DETAILED DESCRIPTION OF EMBODIMENTS

Figure 1:
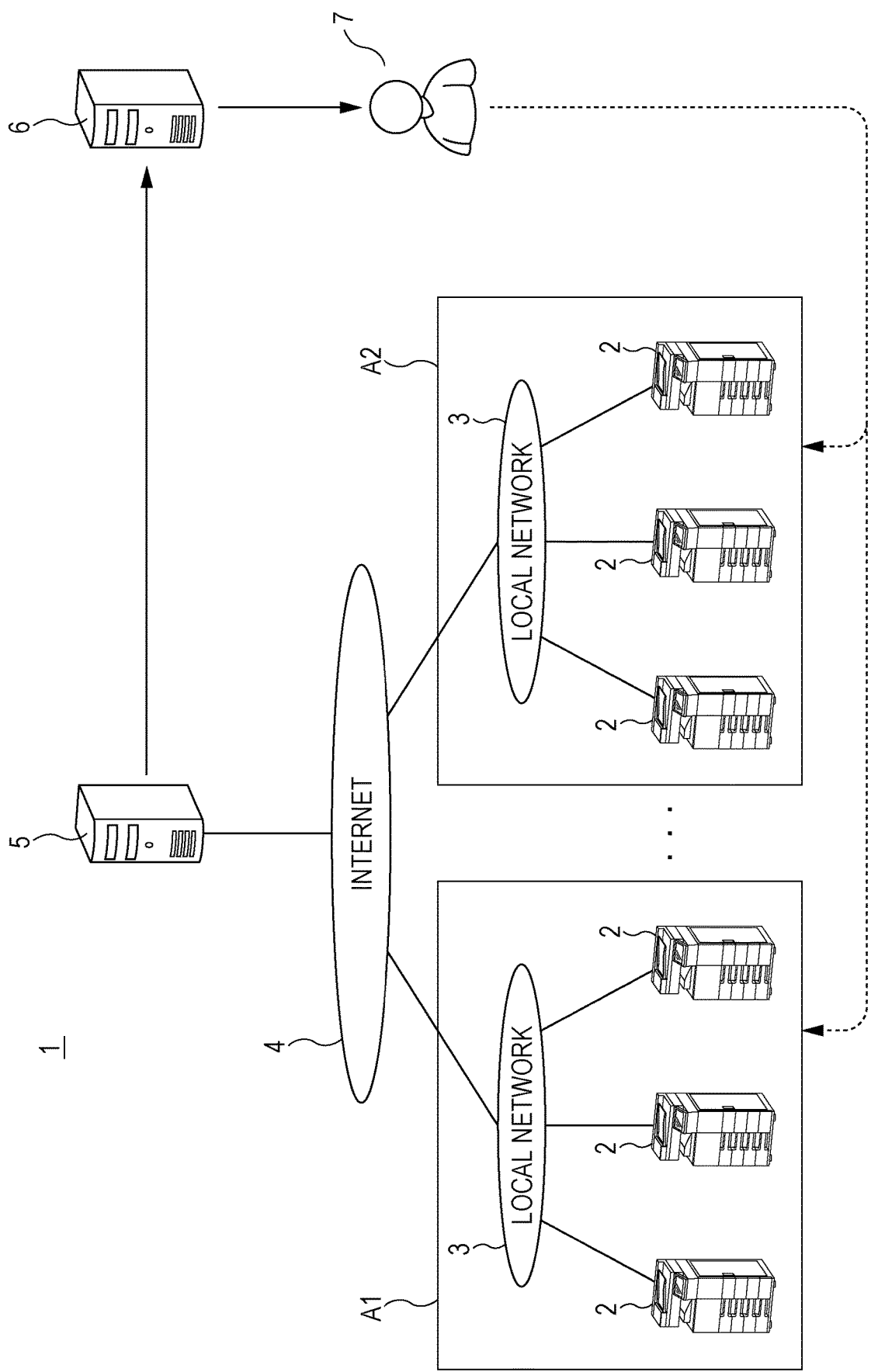
FIG. 1 is a diagram illustrating a configuration example of a prediction system that predicts a failure or the like of an image processing apparatus.

Hereinafter, one or more embodiments of the present invention will be described with reference to the drawings. However, the scope of the invention is not limited to the disclosed embodiments. Note that, in the embodiment described below, the same reference numerals are given to members that are common to each other, and duplicate descriptions thereof will be omitted.

FIG. 1 is a diagram illustrating a configuration example of a prediction system 1 that predicts a failure or the like of an image processing apparatus 2 that is an embodiment of the present invention. The prediction system 1 includes a plurality of the image processing apparatuses 2 installed around the world, a server 5 that collects data from each of the plurality of image processing apparatuses 2 and performs a failure prediction, and a notification server 6 that notifies, based on a notification of the server 5, a maintenance inspector 7 to perform maintenance work of the image processing apparatuses 2 by e-mail or the like. Note that, in the present embodiment, a case is exemplified where the server 5 and the notification server 6 are different servers; however, these may be included in one server.

The server 5 can communicate with each of the plurality of image processing apparatuses 2 installed at a plurality of sites A1 and A2 around the world via, for example, the Internet 4. For example, a plurality of the image processing apparatuses 2 is installed at the site A1, and a plurality of the image processing apparatuses 2 is also installed at the site A2. Each of the plurality of image processing apparatuses 2 is connected to a local network 3 provided at each of the sites A1 and A2. The local network 3 is connected to the Internet 4. Each of the plurality of image processing apparatuses 2 can therefore communicate with the server 5 via the local network 3 of each of the sites A1 and A2, and the Internet 4, and can transmit data for the failure prediction and the like to the server 5.

The image processing apparatus 2 is an apparatus including, for example, an MFP and has a plurality of functions such as a scan function, a print function, and a copy function, and accepts a function selection operation by a user and executes a job, based on a job execution instruction by the user. Examples of the job performed in the image processing apparatus 2 include a scan job, a print job, and a copy job. In a case where the image processing apparatus 2 has a FAX function, it is also possible to execute a job for transmitting and receiving FAX data. In a case where the image processing apparatus 2 includes a post-processing unit, it is also possible to perform post-processing such as stapling or punching during execution of the print job.

When executing the jobs described above, the image processing apparatus 2 operates various movable components mounted therein. If those components fail, it becomes impossible to execute the jobs in the image processing apparatus 2. In addition, those components are expendables consumed with execution of the jobs, and when a certain period of time has elapsed, or when the jobs are executed a predetermined number of times, their replacement time are reached. For that reason, the image processing apparatus 2 acquires data for managing and monitoring various components mounted therein, and regularly transmits the data to the server 5 at predetermined time intervals. It is possible to set as appropriate a timing at which the image processing apparatus 2 regularly transmits the data to the server 5, and the timing is set in advance at predetermined date and time, for example, once a day, once a week, or once a month. However, as a frequency increases at which the image processing apparatus 2 transmits the data to the server 5, a load increases on the server 5. For that reason, the time interval at which the image processing apparatus 2 regularly transmits the data to the server 5, is preferably set to a relatively long interval such as once a month.

Upon receiving the data regularly transmitted from each image processing apparatus 2, the server 5 analyzes the data, thereby predicting in advance the failure, the lifetime, and the like of each component mounted in each image processing apparatus 2. For example, if the server 5 predicts a case where there is a possibility that the failure occurs in the component mounted in the image processing apparatus 2, a case where the end of the lifetime of the component is close, or the like, the server 5 notifies the notification server 6 that it is the replacement time of the component. Upon receiving this notification, the notification server 6 notifies the maintenance inspector 7 being in the vicinity of an installation site of the image processing apparatus 2 that it is necessary to perform the maintenance work of the image processing apparatus 2. The maintenance inspector 7 visits the installation site of the image processing apparatus 2 and performs the maintenance work, whereby the image processing apparatus 2 can maintain a state in which the jobs can be executed.

In the prediction system 1 as described above, even when it is not the timing at which regular transmission of the data is performed to the server 5, the image processing apparatus 2 acquires data for managing and monitoring various components mounted therein, and analyzes the data, thereby determining whether or not the various components have reached the warning state. Here, the warning state is a state in which the possibility of failure is relatively high although the component has not failed, or a state in which the replacement time of the expendable is relatively close, and is a state before the component enters an abnormal state and cannot perform normal operation. Upon detecting that the component has reached the warning state, the image processing apparatus 2 transmits the data to the server 5 even when it is not the regular transmission timing. However, at this time, the image processing apparatus 2 transmits the data at an irregular timing that is not the regular transmission timing. For that reason, when transmitting the data to the server 5 at the irregular timing, the image processing apparatus 2 of the present embodiment performs control not to cause data transmission to be performed simultaneously from the other image processing apparatus 2, and reduce the load on the server 5. Hereinafter, the image processing apparatus 2 will be described in detail.

Figure 2:
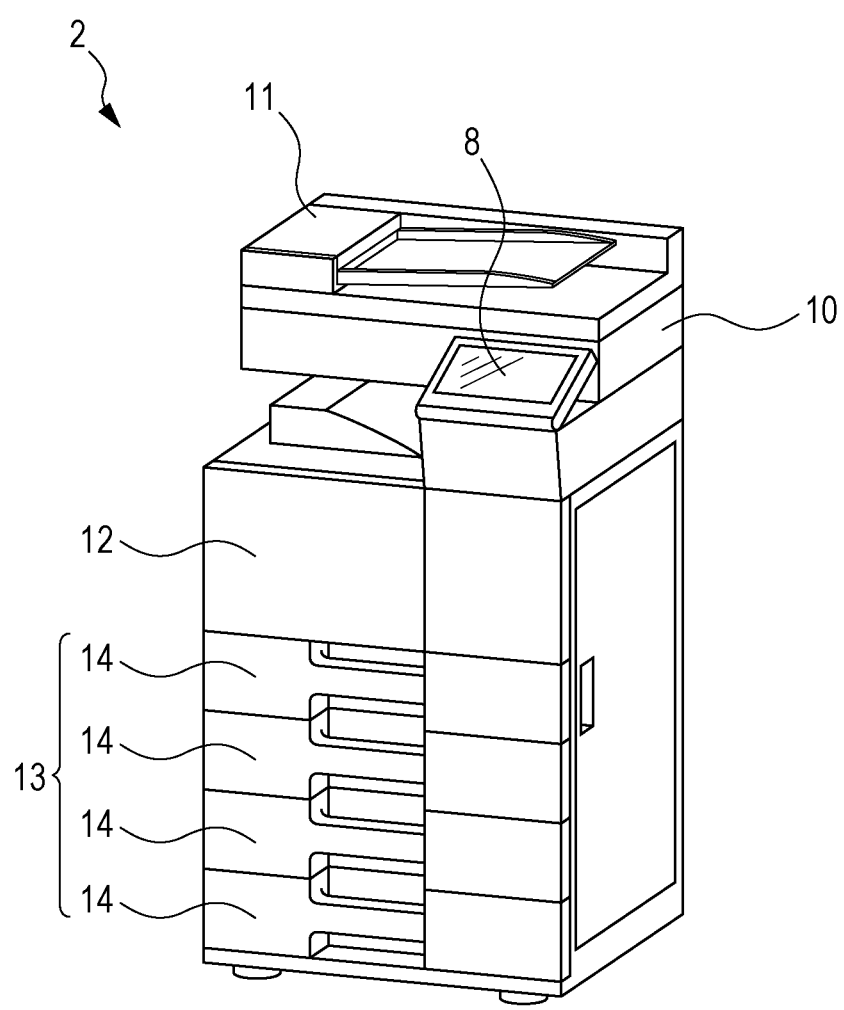
FIG. 2 is a diagram illustrating a configuration example of the image processing apparatus.

FIG. 2 is a diagram illustrating a configuration example of the image processing apparatus 2. The image processing apparatus 2 includes a scanner unit 10 and an automatic document feeder (hereinafter referred to as "ADF") 11 in an upper portion of an apparatus main body. The scanner unit 10 and the ADF 11 perform operations in cooperation with each other when a scan job or a copy job is executed in the image processing apparatus 2. The scanner unit 10 optically reads an image of a document to generate image data. The ADF 11 is provided on the top of the scanner unit 10 and automatically conveys documents set by the user one by one to a document reading position of the scanner unit 10.

The image processing apparatus 2 includes a printer unit 12 and a sheet feeding unit 13 in a lower portion of the apparatus main body. The printer unit 12 and the sheet feeding unit 13 perform operations in cooperation with each other when a print job or a copy job is executed in the image processing apparatus 2. The sheet feeding unit 13 includes a plurality of sheet feeding cassettes 14, and sheets of different directions or sizes can be stocked in the respective sheet feeding cassettes 14. With an execution start of a print job or a copy job, the sheet feeding unit 13 feeds the sheets one by one from one of the sheet feeding cassettes 14 that stocks sheets designated by the user to the printer unit 12. The printer unit 12 performs print output by performing image formation on a sheet fed from the sheet feeding unit 13, based on image data input.

The image processing apparatus 2 further includes an operation panel 8 on the front side of the apparatus main body. The operation panel 8 serves as a user interface when the user uses the image processing apparatus 2.

Figure 3:
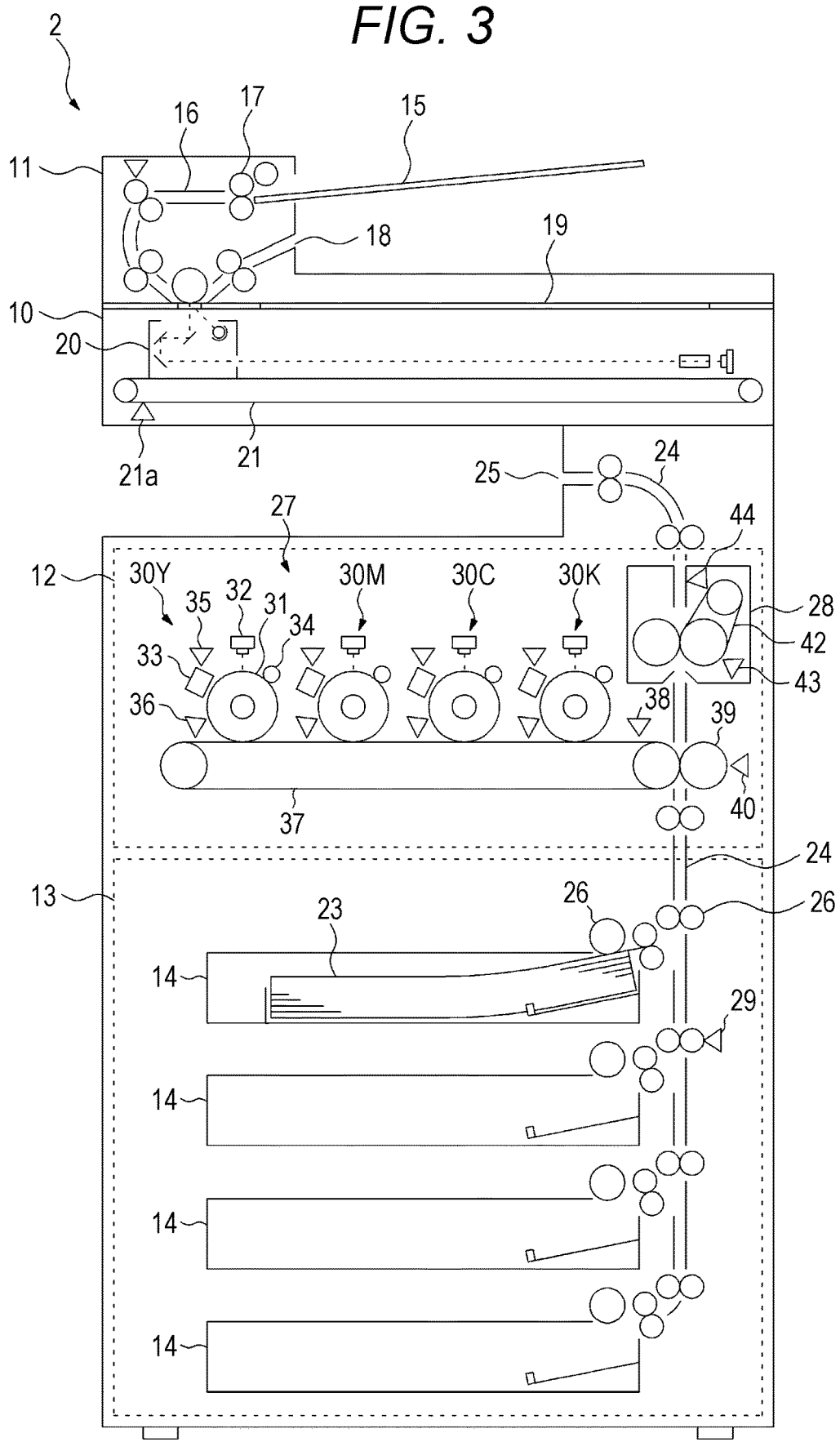
FIG. 3 is a diagram illustrating an example of an internal structure in an apparatus main body of the image processing apparatus.

FIG. 3 is a diagram illustrating an example of an internal structure of the image processing apparatus 2. The scanner unit 10 includes a reading head 20, a drive belt 21, and a sensor 21a. The reading head 20 emits light to a document conveyed by the ADF 11 and guides reflected light from the document to a photoelectric conversion element. The reading head 20 is also capable of reading a document placed on a platen glass 19. That is, the reading head 20 is movable in a sub-scanning direction by the drive belt 21, and reads the image of the document by moving in the sub-scanning direction while reading the image of the document placed on the platen glass 19 in a main scanning direction. The sensor 21a is a sensor for measuring a sliding distance of the drive belt 21. For example, when the drive belt 21 is driven for a predetermined distance or more, its replacement time is reached. For that reason, to predict the replacement time of the drive belt 21, the sensor 21a measures the sliding distance of the drive belt 21 and monitors an operation state of the drive belt 21.

The ADF 11 includes a document tray 15 on which the documents are placed, a conveying path 16 through which the documents are conveyed, and conveying rollers 17, and the conveying rollers 17 convey the documents set on the document tray 15 one by one to the conveying path 16 and eject the documents from an ejection port 18. The ADF 11 is also provided with movable components such as the conveying rollers 17. For that reason, a sensor that monitors operation states of the movable components is provided also inside the ADF 11.

The sheet feeding unit 13 and the printer unit 12 are provided with a conveying path 24 through which a sheet 23 is conveyed. The conveying path 24 communicates with an ejection port 25 provided above the printer unit 12.

The sheet feeding unit 13 includes a plurality of rollers 26 that takes out and conveys the sheets 23 stocked in the sheet feeding cassettes 14 one by one along the conveying path 24, and conveys the sheets 23 by rotating the rollers 26. The sheet feeding unit 13 is provided with a sensor 29 for measuring a travel distance (the number of rotations) of the rollers 26. For example, when the rollers 26 are driven for a predetermined distance (the number of rotations) or more, their replacement times are reached. For that reason, to predict the replacement time of the rollers 26, the sensor 29 measures the travel distance (the number of rotations) of the rollers 26 and monitors operation states of the rollers 26.

The printer unit 12 includes an image forming section 27 and a fixing unit 28. The image forming section 27 has a configuration capable of forming a color image using toners of four colors of yellow (Y), magenta (M), cyan (C), and black (K), and includes image forming units 30Y, 30M, 30C, and 30K corresponding to the respective four colors.

The image forming unit 30Y includes a photosensitive drum 31, an exposing unit 32 that exposes a surface of the photosensitive drum 31 based on the image data to form an electrostatic latent image, a developing unit 33 that applies toner to the electrostatic latent image to form a toner image on the surface of the photosensitive drum 31, and a charging unit 34 that charges the surface of the photosensitive drum 31. A sensor 35 for measuring a remaining amount of toner is arranged in the vicinity of the developing unit 33, and a sensor 36 for measuring a sliding distance of the photosensitive drum 31 is arranged in the vicinity of the photosensitive drum 31. For example, when there is no remaining amount of toner in the developing unit 33, a replacement time is reached of a toner bottle, and when the sliding distance is a predetermined distance or more, a replacement time is reached of the photosensitive drum 31. For that reason, the sensors 35 and 36 are sensors provided to predict the replacement times of the toner bottle and the photosensitive drum. Note that, the other image forming units 30M, 30C, and 30K each have a configuration similar to the configuration of the image forming unit 30Y.

The toner image formed on the photosensitive drum 31 is transferred to an intermediate transfer belt 37. The intermediate transfer belt 37 forms a color image on a surface of the belt by sequentially transferring the toner images of the four colors. When the sheet 23 fed from the sheet feeding unit 13 passes through a transfer roller 39, the color image formed on the intermediate transfer belt 37 is retransferred to the sheet 23. A sensor 38 for measuring a sliding distance of the intermediate transfer belt 37 is provided in the vicinity of the intermediate transfer belt 37. A sensor 40 for measuring a travel distance of the transfer roller 39 is provided in the vicinity of the transfer roller 39. These sensors 38 and 40 are sensors provided to monitor an operation state of the intermediate transfer belt 37 or the transfer roller 39 and predict their replacement times. The sheet 23 to which the color image is transferred by the transfer roller 39 is then conveyed to the fixing unit 28, and fixing processing is performed of the color image transferred to the surface.

The fixing unit 28 includes a fixing belt 42, and performs heat processing and pressure processing to the sheet 23 to which the color image is transferred, thereby fixing the color image on the sheet 23. The fixing unit 28 is provided with a sensor 43 for measuring a temperature of the fixing belt 42, and a sensor 44 for measuring a sliding distance of the fixing belt 42. That is, these sensors 43 and 44 are sensors provided to monitor operation states of components provided in the fixing unit 28 and predict their replacement times. The sheet 23 subjected to the fixing processing of the color image in the fixing unit 28 is then ejected from the ejection port 25.

As described above, the image processing apparatus 2 incorporates various sensors for monitoring the operation states of the components provided therein. Sensor measurement values measured by these sensors are included in the data regularly transmitted to the server 5 by the image processing apparatus 2.

Figure 4:
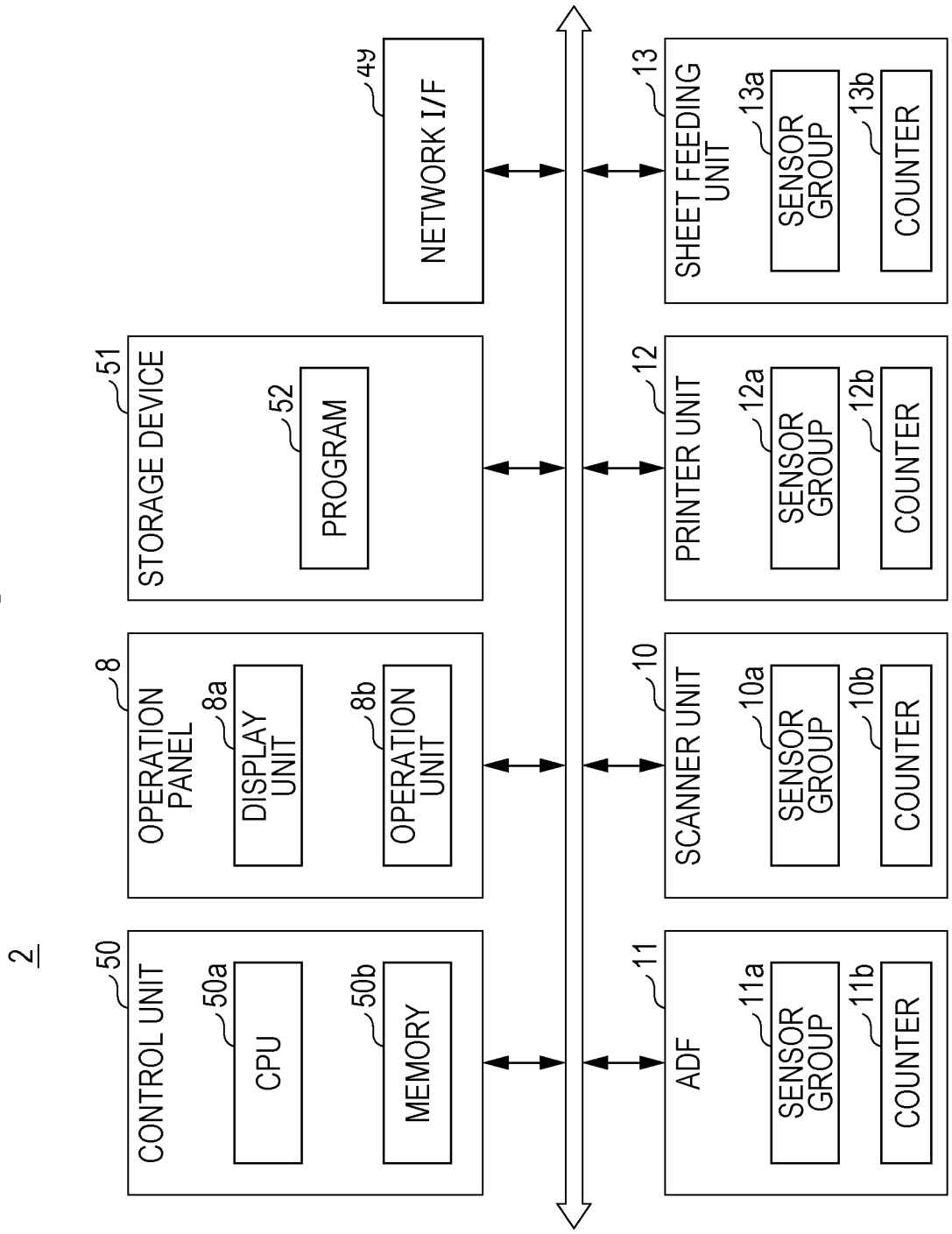
FIG. 4 is a diagram illustrating a hardware configuration for performing electrical control in the image processing apparatus.

FIG. 4 is a diagram illustrating a hardware configuration for performing electrical control in the image processing apparatus 2. The image processing apparatus 2 includes a control unit 50, the operation panel 8, a storage device 51, a network interface 49, the ADF 11, the scanner unit 10, the printer unit 12, and the sheet feeding unit 13, and these units can mutually input and output data via a data bus.

The control unit 50 includes a CPU 50a and a memory 50b, and comprehensively controls operation of each unit in the image processing apparatus 2. The CPU 50a is a hardware processor capable of executing a program 52. For example, when the image processing apparatus 2 is powered on, the CPU 50a reads and executes the program 52 stored in the storage device 51, thereby functioning as various processing units as described later and controlling operation of each unit. The memory 50b is for temporarily storing data and the like to be used when the CPU 50a executes processing based on the program 52.

The operation panel 8 includes a display unit 8a and an operation unit 8b. The display unit 8a includes, for example, a color liquid crystal display, and displays various screens that can be operated by the user. The operation unit 8b includes, for example, a touch panel key arranged on the screen of the display unit 8a, and accepts operation by the user.

The storage device 51 is a nonvolatile storage device including, for example, a hard disk drive (HDD). The program 52 described above is stored in the storage device 51. Various types of data as described later are also stored in the storage device 51.

The network interface 49 is for connecting the image processing apparatus 2 to the local network 3. The image processing apparatus 2 communicates with the server 5 via the network interface 49.

The ADF 11 includes a sensor group 11a and a counter 11b. The sensor group 11a includes at least one sensor that monitors the operation states of the movable components that operate when the ADF 11 performs document feeding. The sensor group 11a outputs to the control unit 50 a sensor measurement value of the operation states of the movable components measured based on a request from the control unit 50. The counter 11b counts and accumulates the number of documents fed by the ADF 11. The counter 11b outputs to the control unit 50 a count value of the number of documents fed by the ADF 11, based on a request from the control unit 50.

The scanner unit 10 includes a sensor group 10a and a counter 10b. The sensor group 10a includes at least one sensor that monitors the operation states of the movable components that operate when the scanner unit 10 performs document reading. For example, the sensor 21a described above is included in the sensor group 10a. The sensor group 10a outputs to the control unit 50 a sensor measurement value of the operation states of the movable components measured based on a request from the control unit 50. The counter 10b counts and accumulates the number of documents read by the scanner unit 10. The counter 10b outputs to the control unit 50 a count value of the number of documents read by the scanner unit 10, based on a request from the control unit 50.

The printer unit 12 includes a sensor group 12a and a counter 12b. The sensor group 12a includes a plurality of sensors that monitors the operation states of the movable components that operate when the printer unit 12 performs print output. For example, the sensors 35, 36, 38, 40, 43, and 44 described above are included in the sensor group 12a. The sensor group 12a outputs to the control unit 50 a sensor measurement value of the operation states of the movable components measured based on a request from the control unit 50. The counter 12b counts and accumulates the number of sheets printed out in the printer unit 12. The counter 12b outputs to the control unit 50 a count value of the number of sheets printed out by the printer unit 12, based on a request from the control unit 50.

The sheet feeding unit 13 includes a sensor group 13a and a counter 13b. The sensor group 13a includes at least one sensor that monitors the operation states of the movable components that operate when the sheet feeding unit 13 feeds one sheet. The sensor group 13a outputs to the control unit 50 a sensor measurement value of the operation states of the movable components measured based on a request from the control unit 50. The counter 13b counts and accumulates the number of sheets fed to the printer unit 12. The counter 13b may be provided for each of the sheet feeding cassettes 14. The counter 13b outputs to the control unit 50 a count value of the number of fed sheets, based on a request from the control unit 50.

Figure 5:
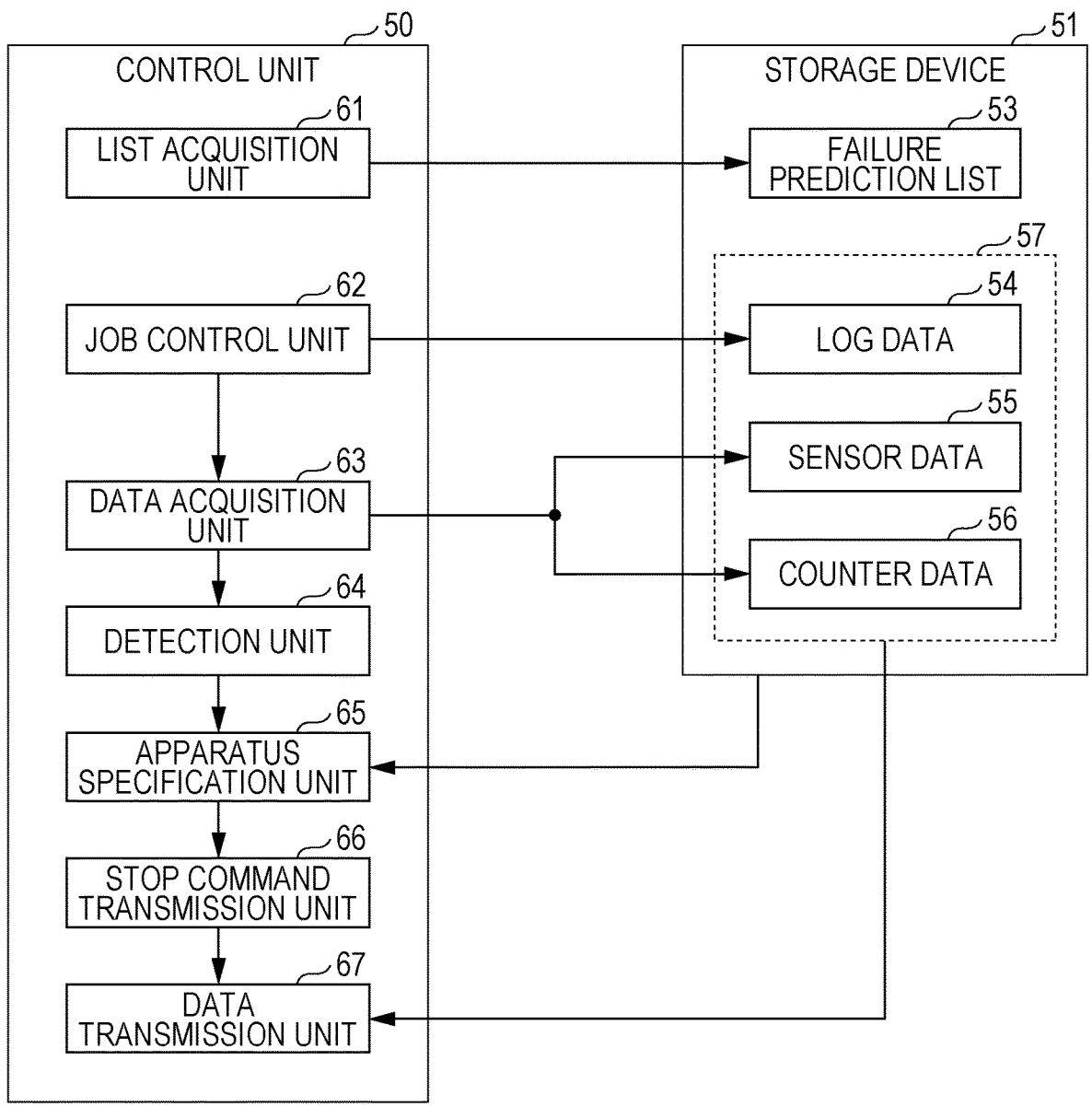
FIG. 5 is a block diagram illustrating a functional configuration of a control unit.

FIG. 5 is a block diagram illustrating an example of a functional configuration of the control unit 50. The CPU 50a executes the program 52 in the control unit 50, whereby the control unit 50 functions as a list acquisition unit 61, a job control unit 62, a data acquisition unit 63, a detection unit 64, an apparatus specification unit 65, a stop command transmission unit 66, and a data transmission unit 67. As illustrated in FIG. 5, the storage device 51 stores a failure prediction list 53, log data 54, sensor data 55, and counter data 56.

The list acquisition unit 61 is a processing unit that acquires the failure prediction list 53 in a case where the image processing apparatus 2 receives the failure prediction list 53 transmitted from the server 5, and stores the failure prediction list 53 in the storage device 51. The failure prediction list 53 is a list in which the plurality of image processing apparatuses 2 is ranked in order from the one whose possibility of failure is higher, or in order from the one whose replacement time of the component is closer, in the server 5. Details of the failure prediction list 53 will be described later.

The job control unit 62 controls execution of a job in the image processing apparatus 2. The job control unit 62 controls the operations of the ADF 11, the scanner unit 10, the printer unit 12, and the sheet feeding unit 13, thereby controlling execution of a job designated by the user. With the execution of the job designated by the user, the job control unit 62 records an execution history of the job in the log data 54. The log data 54 includes information such as execution date and time of the job, a type of the job, and presence or absence of occurrence of an abnormality such as an error.

The data acquisition unit 63 is a processing unit that acquires the sensor data 55 and the counter data 56 from the inside of the apparatus main body. That is, the data acquisition unit 63 makes a request for the sensor measurement value to each of the sensor groups 10a, 11a, 12a, and 13a, and acquires a plurality of sensor measurement values output from the respective sensor groups 10a, 11a, 12a, and 13a as the sensor data 55. The data acquisition unit 63 makes a request for the count value to each of the counters 10b, 11b, 12b, and 13b, and acquires a plurality of count values output from the respective counters 10b, 11b, 12b, and 13b as the counter data 56. The data acquisition unit 63 stores the sensor data 55 and the counter data 56 in the storage device 51.

For example, in a case where the job is executed by the job control unit 62, the data acquisition unit 63 acquires the sensor data 55 and the counter data 56 from each of the scanner unit 10, the ADF 11, the printer unit 12, and the sheet feeding unit 13, and stores the data in the storage device 51. The data acquisition unit 63 may repeatedly acquire the sensor data 55 and the counter data 56 during execution of the job or may acquire the data at the end of the execution of the job. The sensor data 55 and the counter data 56 are data that vary with execution of the job. For that reason, with the execution of the job, the data acquisition unit 63 acquires the sensor data 55 and the counter data 56 and stores the data in the storage device 51, whereby the sensor data 55 and the counter data 56 stored in the storage device 51 are updated to the latest data. This latest data is data representing a current state of each component.

However, not limited to the timing at which the job is executed by the job control unit 62, the data acquisition unit 63 may acquire the sensor data 55 and the counter data 56 also at other timings. For example, when the timing is reached at which the image processing apparatus 2 performs the regular transmission of the data to the server 5, the data acquisition unit 63 may acquire the sensor data 55 and the counter data 56 from each of the scanner unit 10, the ADF 11, the printer unit 12, and the sheet feeding unit 13, and store the latest data in the storage device 51.

The detection unit 64 functions in a case where the sensor data 55 and the counter data 56 are acquired by the data acquisition unit 63. Then, the detection unit 64 analyzes the sensor data 55 and the counter data 56 acquired by the data acquisition unit 63, thereby determining whether or not there is a component having entered the warning state. That is, the detection unit 64 judges whether or not there is a component in a state in which the possibility of failure is relatively high although the component has not failed, or in a state in which the replacement time of the expendable is relatively close. Then, upon detecting that any of the components mounted inside the image processing apparatus 2 has reached the warning state, the detection unit 64 decides to perform data transmission to the server 5. When this decision is made, the control unit 50 causes the apparatus specification unit 65, the stop command transmission unit 66, and the data transmission unit 67 to function.

When it is detected by the detection unit 64 that any of the components has reached the warning state, the apparatus specification unit 65 reads the failure prediction list 53 from the storage device 51. Then, the apparatus specification unit 65 refers to the failure prediction list 53, and specifies, as a data transmission stop apparatus, an apparatus that is to be caused to stop data transmission to the server 5, among the other image processing apparatuses 2 with which the image processing apparatus 2 can communicate. Specifically, the apparatus specification unit 65 refers to the failure prediction list 53, thereby specifying, as the data transmission stop apparatus, the other image processing apparatus 2 whose rank is lower than that of the image processing apparatus 2. As described above, the failure prediction list 53 is a list in which the plurality of image processing apparatuses 2 is ranked in order from the one whose possibility of failure is higher, or in order from the one whose replacement time of the component is closer. For that reason, the apparatus specification unit 65 specifies, as the data transmission stop apparatus, the other image processing apparatus 2 whose possibility of failure is lower than that of the image processing apparatus 2, or the other image processing apparatus 2 whose component replacement time is farther than that of the image processing apparatus 2.

When it is detected by the detection unit 64 that any of the components has reached the warning state, the apparatus specification unit 65 refers to the failure prediction list 53 stored in the storage device 51, and specifies, as a data transmission priority apparatus, an apparatus to which priority is to be given to perform the data transmission to the server 5, among the other image processing apparatuses 2 with which the image processing apparatus 2 can communicate. Specifically, the apparatus specification unit 65 refers to the failure prediction list 53, thereby specifying, as the data transmission priority apparatus, the other image processing apparatus 2 whose rank is higher than that of the image processing apparatus 2. For that reason, the apparatus specification unit 65 specifies, as the data transmission priority apparatus, the other image processing apparatus 2 whose possibility of failure is higher than that of the image processing apparatus 2, or the other image processing apparatus 2 whose component replacement time is closer than that of the image processing apparatus 2.

The stop command transmission unit 66 is a processing unit that transmits a stop command for causing the data transmission to the server 5 to be stopped to the data transmission stop apparatus in a case where the data transmission stop apparatus is specified by the apparatus specification unit 65. Upon receiving the stop command, the other image processing apparatus 2 does not perform data transmission to the server 5. When the other image processing apparatus 2 receives the stop command during performing the data transmission to the server 5, the other image processing apparatus 2 suspends the data transmission to the server 5. For that reason, the stop command transmission unit 66 transmits the stop command to the data transmission stop apparatus, thereby being able to create a state in which data transmission is not performed to the server 5 from the data transmission stop apparatus whose rank is lower than that of the image processing apparatus 2.

The stop command transmission unit 66 transmits the stop command to the data transmission stop apparatus with which the image processing apparatus 2 can communicate. For example, the plurality of image processing apparatuses 2 provided at the site A1 can communicate with each other via the local network 3. However, the image processing apparatus 2 provided at the site A1 cannot communicate with the other image processing apparatuses 2 provided at the other site A2. For that reason, the stop command transmission unit 66 transmits the stop command to, for example, the data transmission stop apparatus connected to the same local network 3 as the image processing apparatus 2, thereby being able to prevent the data transmission from being performed to the server 5 from the data transmission stop apparatus connected to the same local network 3 as the image processing apparatus 2.

However, in a case where the image processing apparatus 2 provided at the site A1 can communicate with the other image processing apparatus 2 provided at the other site A2, the stop command transmission unit 66 preferably transmits the stop command also to the other image processing apparatus (data transmission stop apparatus) 2 provided at the other site A2.

The data transmission unit 67 is a processing unit that transmits data to the server 5. When it is discriminated by the detection unit 64 that the component is in the warning state, the data transmission unit 67 reads the log data 54, the sensor data 55, and the counter data 56 stored in the storage device 51, and generates the data 57 to be transmitted to the server 5. Then, the data transmission unit 67 transmits the data 57 to the server 5. At this time, the data transmission unit 67 may add, to the data 57, information relating to the component detected by the detection unit 64 as being in the warning state. However, not limited to this, for example, when it is discriminated by the detection unit 64 that the component is in the warning state, the data transmission unit 67 may transmit only data relating to the component in the warning state to the server 5.

For example, when the data transmission unit 67 transmits the data 57 to the server 5 in a case where it is detected by the detection unit 64 that the component is in the warning state, data transmission is not being performed to the server 5 from the data transmission stop apparatus whose rank is lower than that of the image processing apparatus 2, due to the stop command transmitted by the stop command transmission unit 66. For that reason, when the data transmission unit 67 transmits the data 57 to the server 5, it is possible to avoid that data transmission is simultaneously performed with the data transmission stop apparatus. Thus, the load is reduced on the server 5, so that the data transmission unit 67 can efficiently transmit the data 57. As a result, the server 5 can quickly grasp that the component has entered the warning state in the image processing apparatus 2, and can promptly notify the notification server 6.

When the data transmission unit 67 determines that it is a timing at which the image processing apparatus 2 regularly transmits the data 57 to the server 5, the data transmission unit 67 causes the data acquisition unit 63 to acquire the data 57. Then, the data transmission unit 67 transmits to the server 5 the data 57 including the log data 54, the sensor data 55, and the counter data 56.

In a case where the data transmission unit 67 receives the stop command from the other image processing apparatus 2 whose rank is higher than that of the image processing apparatus 2 when trying to transmit the data 57 to the server 5, the data transmission unit 67 does not perform the data transmission to the server 5, and waits. Then, in a case where a permission command is received from the other image processing apparatus 2, the data transmission to the server 5 is started. Further, in a case where the data transmission unit 67 receives the stop command from the other image processing apparatus 2 whose rank is higher than that of the image processing apparatus 2 when having already started transmission of the data 57 to the server 5, the data transmission unit 67 temporarily suspends the data transmission to the server 5. Then, in a case where the permission command is received from the other image processing apparatus 2, the data transmission to the server 5 is resumed. That is, when the image processing apparatus 2 transmits the data 57 to the server 5, the data transmission unit 67 does not perform data transmission simultaneously with the other image processing apparatus 2 as much as possible, thereby preventing that the load suddenly rise temporarily on the server 5.

Figure 6:
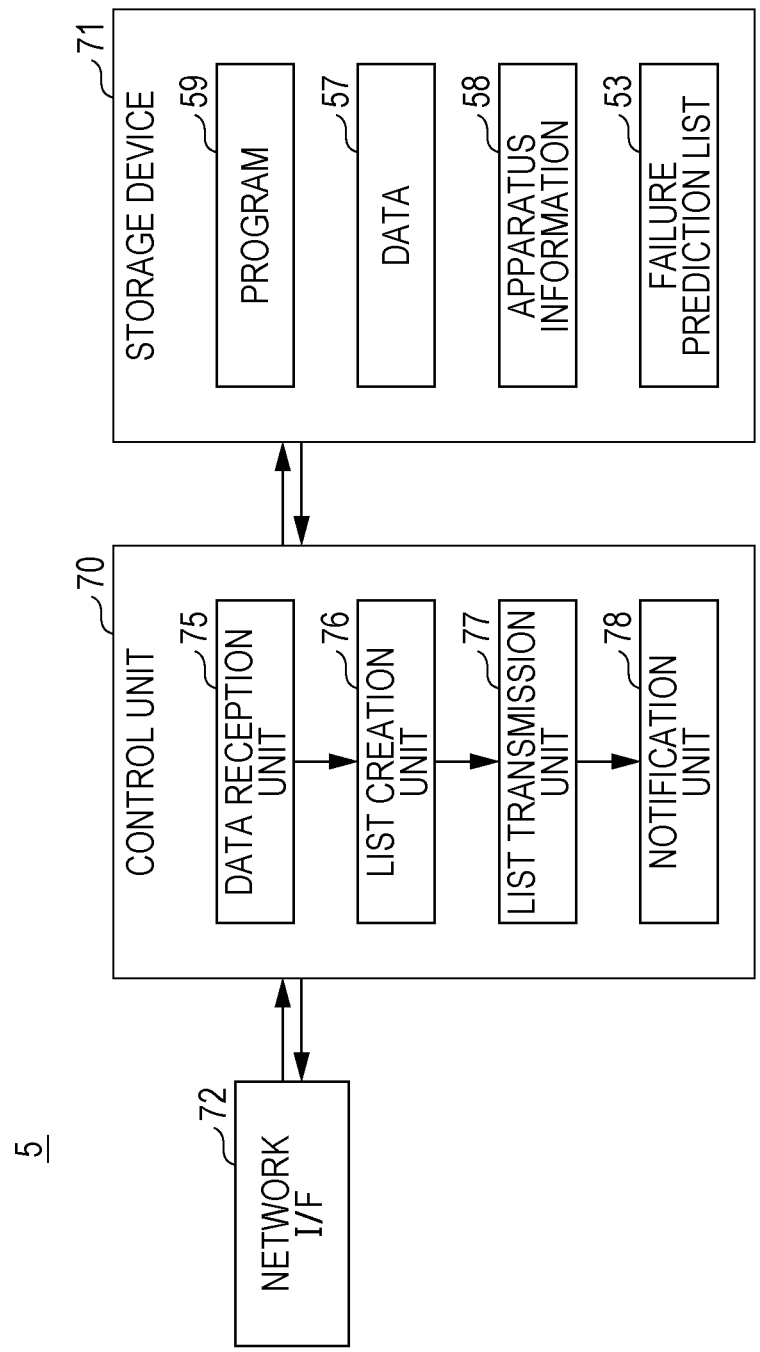
FIG. 6 is a diagram illustrating an example of a hardware configuration and a functional configuration of a server.

FIG. 6 is a diagram illustrating an example of a hardware configuration and a functional configuration of the server 5. The server 5 includes a control unit 70, a storage device 71, and a network interface 72 as its hardware configuration. The control unit 70 includes a CPU and a memory (not illustrated). The storage device 71 is a nonvolatile storage device including, for example, a hard disk drive (HDD), and stores a program 59, the data 57, apparatus information 58, and the failure prediction list 53. The apparatus information 58 is, for example, information in which the plurality of image processing apparatuses 2 managed by the server 5 is registered in advance, and includes information relating to a site where each image processing apparatus 2 is installed, and information relating to the local network 3 to which each image processing apparatus 2 is connected. The network interface 72 is for connecting the server 5 to a network including the Internet 4, and communicating with the image processing apparatus 2 and the notification server 6.

The CPU provided in the control unit 70 is a hardware processor capable of executing the program 59. The CPU executes the program 59, whereby the control unit 70 functions as a data reception unit 75, a list creation unit 76, a list transmission unit 77, and a notification unit 68.

The data reception unit 75 receives the data 57 transmitted from the image processing apparatus 2 via the network interface 72. Upon receiving the data 57 transmitted from the image processing apparatus 2, the data reception unit 75 stores the data 57 in the storage device 71. The data 57 is transmitted to the server 5 from each of the plurality of image processing apparatuses 2. For that reason, in the storage device 71, the latest data 57 is stored transmitted from each of the plurality of image processing apparatuses 2.

The list creation unit 76 functions in a case where the data reception unit 75 receives the data 57. The list creation unit 76 reads the data 57 stored in the storage device 71, and based on the data 57, predicts in advance the failure, the lifetime, and the like of each component mounted in each image processing apparatus 2. The list creation unit 76 ranks each of the plurality of image processing apparatuses 2 in order from the one whose possibility of failure is higher, or in order from the one whose replacement time of the component is closer, and creates the failure prediction list 53. In addition to determining the possibility of failure of the component and a degree of arrival at the replacement time of the component, the list creation unit 76 may judge the number of times of abnormality occurrence of the component in each image processing apparatus 2, based on the log data 54 included in the data 57, for example, and rank each image processing apparatus 2 depending on the number of times of abnormality occurrence.

At this time, the list creation unit 76 may create one failure prediction list 53 in which the plurality of image processing apparatuses 2 installed at sites around the world is collectively ranked. However, it takes time to rank all of the plurality of image processing apparatuses 2 installed around the world. For that reason, it is preferable that the list creation unit 76 refers to the apparatus information 58, thereby specifying the plurality of image processing apparatuses 2 installed at the same site or the plurality of image processing apparatuses 2 connected to the same local network 3, and ranking the plurality of image processing apparatuses 2 for each site or each local network 3. Ranking is performed for each site or for each local network 3, whereby there is an advantage that the failure prediction list 53 can be efficiently created.

For example, in a case where the data reception unit 75 receives the data 57 transmitted from the image processing apparatus 2 installed at the site A1, the list creation unit 76 extracts only the data 57 of the plurality of image processing apparatuses 2 installed at the site A1 from the data 57 stored in the storage device 71, and analyzes the data 57 extracted, thereby ranking the plurality of image processing apparatuses 2 installed at the site A1. In this case, if there is no change in the data 57 of the plurality of image processing apparatuses 2 installed at the other site A2, there is no need to rank the plurality of image processing apparatuses 2 installed at the site A2, so that the processing burden can be reduced in the server 5.

FIG. 7 is a diagram illustrating an example of the failure prediction list 53. The failure prediction list 53 includes an apparatus name 53a, an address 53b, a component rank 53c, and an overall rank 53d of each of the plurality of image processing apparatuses 2 ranked. For example, the apparatus name 53a is identification information capable of identifying each of the plurality of image processing apparatuses 2. The address 53b is an address for communicating with each of the plurality of image processing apparatuses 2. The component rank 53c is a rank indicating ease of failure of an individual component mounted in each image processing apparatus 2, and indicates that the component has a higher possibility of failure, or the replacement time of the component is closer, as a numerical value of the rank is greater, for example. Since a plurality of components is mounted in the image processing apparatus 2, a rank corresponding to each of the plurality of components is recorded in the component rank 53c. The overall rank 53d is a rank indicating whether or not there is a high possibility that any of the components fails in the image processing apparatus 2, and is a rank decided by comprehensively evaluating the component rank 53c.

Based on the data 57 acquired from each image processing apparatus 2, the list creation unit 76 grasps a state of the individual component and decides its rank, and records the rank decided in the component rank 53c. For example, in a case where it is found that voltage values vary when the charging unit 34 for charging the surface of the photosensitive drum 31 charges the photosensitive drum 31, in the data 57 acquired from the image processing apparatus 2, the list creation unit 76 determines that there is a high possibility that the charging unit 34 fails, and sets the component rank 53c corresponding to the charging unit 34 higher. For example, in a case where a print count value exceeds a predetermined value in the data 57 acquired from the image processing apparatus 2, the list creation unit 76 determines that the replacement time of the photosensitive drum 31 or the intermediate transfer belt 37 is close, and sets the component rank 53c corresponding to the photosensitive drum 31 or the intermediate transfer belt 37 higher.

When deciding the overall rank 53d, the list creation unit 76 may obtain an average value of the component rank 53c of the components, for example, and decide the average value as the overall rank 53d. However, since the components mounted in the image processing apparatus 2 include important components and components not so important, the overall rank 53d on which a degree of importance of the component is reflected is not obtained merely by calculating the average value of the component rank 53c. It is therefore preferable that the list creation unit 76 decides the overall rank 53d by performing weighting calculation of the component rank 53c of each component depending on the degree of importance of the component. For example, in a case where it becomes impossible to execute a print job in the image processing apparatus 2 when a certain component fails, if the degree of importance of the component is set higher in advance, the overall rank 53d of the image processing apparatus 2 largely varies depending on variation of the possibility of failure of the component. For that reason, the list creation unit 76 decides the overall rank 53d on which the degree of importance of each component is reflected, whereby the overall rank 53d recorded in the failure prediction list 53 becomes a rank indicating whether or not there is a high possibility that it becomes impossible to execute the job in the image processing apparatus 2.

When the failure prediction list 53 is created as described above, the list creation unit 76 stores the failure prediction list 53 in the storage device 71. In a case where the failure prediction list 53 is created for each site or for each local network 3 by the list creation unit 76, the storage device 71 stores a plurality of the failure prediction lists 53. The failure prediction lists 53 stored in the storage device 71 are updated each time the data 57 is received from the image processing apparatus 2.

In a case where the data 57 is received from one image processing apparatus 2 among the plurality of image processing apparatuses 2 included in the failure prediction list 53 in a state in which the failure prediction list 53 has already been created, the list creation unit 76 may change only the rank of the one image processing apparatus 2 to update the failure prediction list 53, based on the data 57. That is, since the rank of each image processing apparatus 2 is a rank decided depending on the state of the component inside the apparatus, there is no correlation with the rank of the other image processing apparatus 2. For that reason, in a case where the data 57 is received, the list creation unit 76 updates only the rank of the image processing apparatus 2 that has transmitted the data 57, thereby being enabled to efficiently update the failure prediction list 53.

The list creation unit 76 determines whether or not the data 57 received by the data reception unit 75 is data indicating that the component is in the warning state. As a result of the determination, in a case where the data 57 received by the data reception unit 75 is the data indicating that the component is in the warning state, the list creation unit 76 causes the notification unit 78 to function.

The list transmission unit 77 transmits the failure prediction list 53 to the image processing apparatus 2 each time the failure prediction list 53 is created or updated by the list creation unit 76. For example, in a case where the failure prediction list 53 for each site or for each local network 3 is created or updated by the list creation unit 76, the list transmission unit 77 refers to the apparatus information 58 and specifies the site or the local network 3 to be a transmission destination of the failure prediction list 53. The list transmission unit 77 transmits the failure prediction list 53 to the plurality of image processing apparatuses 2 provided in the site or the local network 3 specified. Thus, each image processing apparatus 2 is enabled to obtain the latest failure prediction list 53 from the server 5 each time the failure prediction list 53 is created or updated in the server 5.

The notification unit 78 is for notifying the notification server 6. That is, when it is determined by the list creation unit 76 that the component of the image processing apparatus 2 is in the warning state, the notification unit 78 notifies the notification server 6 of the image processing apparatus 2 and the component in the warning state. Thus, the notification server 6 can grasp a dispatch place of the maintenance inspector 7, the image processing apparatus 2 in the warning state, and the component to be subjected to the maintenance work, and is enabled to notify the maintenance inspector 7 to perform the maintenance work.

Figure 8:
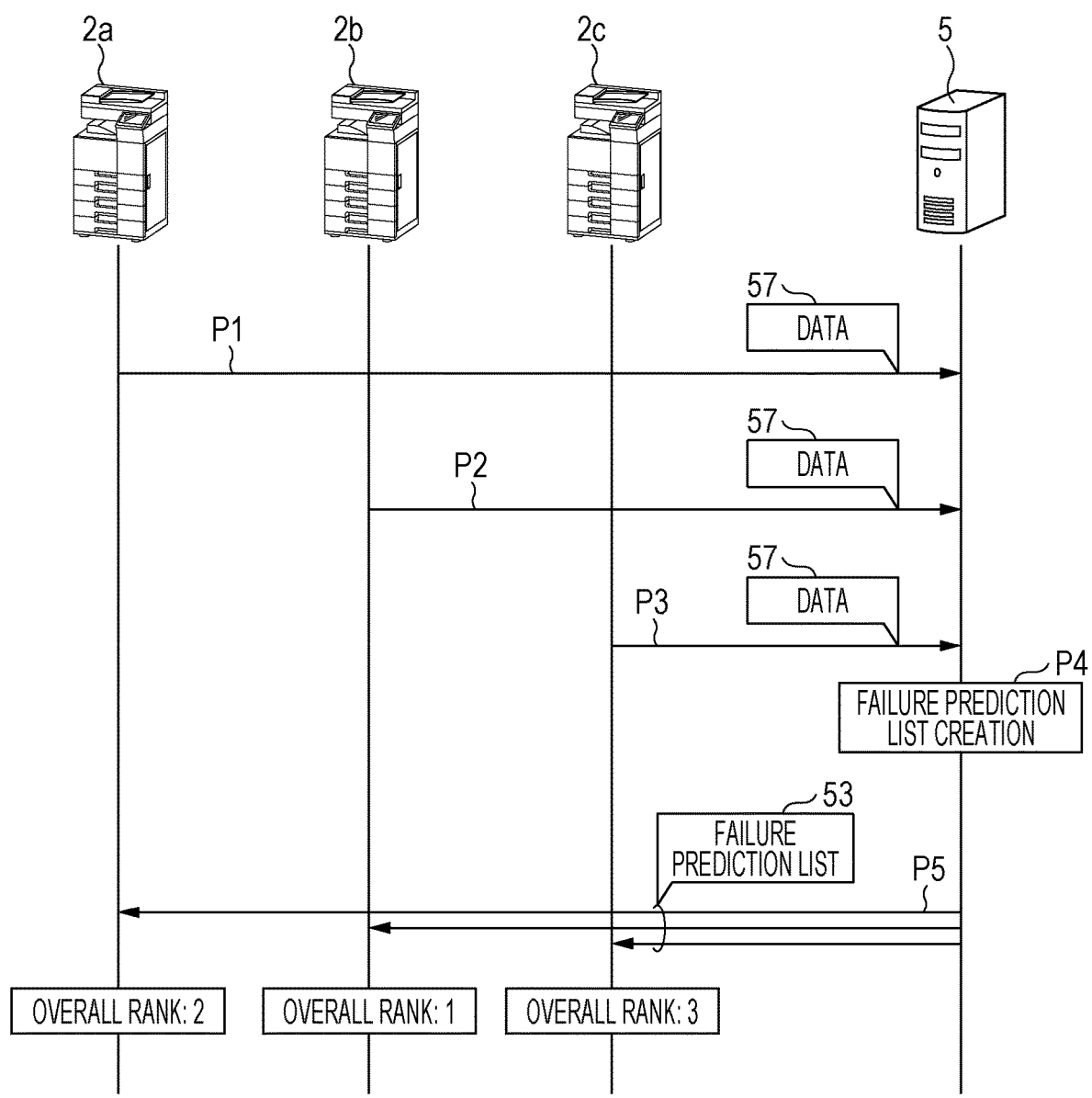
FIG. 8 is a diagram illustrating an example of operation until a plurality of image processing apparatuses obtains a failure prediction list.

Next, operation will be described of the prediction system 1 having the above-described configuration. FIG. 8 is a diagram illustrating an example of the operation until a plurality of image processing apparatuses 2a, 2b, and 2c acquires the failure prediction list 53. Note that, in FIG. 8, a case is exemplified where the plurality of image processing apparatuses 2a, 2b, and 2c is connected to the same local network 3, and this also applies to other operation examples described below.

First, as illustrated in FIG. 8, upon detecting that a regular data transmission timing is reached, the image processing apparatus 2a acquires the data 57 to be transmitted from the apparatus main body to the server 5, and transmits the data 57 to the server 5 (process P1). Thereafter, upon detecting that the regular data transmission timing is reached, the image processing apparatus 2b acquires the data 57 to be transmitted from the apparatus main body to the server 5, and transmits the data 57 to the server 5 (process P2). Thereafter, upon detecting that the regular data transmission timing is reached, the image processing apparatus 2c acquires the data 57 to be transmitted from the apparatus main body to the server 5, and transmits the data 57 to the server 5 (process P3). Upon receiving the data 57 from each of the plurality of image processing apparatuses 2a, 2b, and 2c, the server 5 generates the failure prediction list 53 in which the plurality of image processing apparatuses 2a, 2b, and 2c is ranked (process P4). Then, the server 5 transmits the failure prediction list 53 to each of the plurality of image processing apparatuses 2a, 2b, and 2c (process P5). Upon receiving the failure prediction list 53 from the server 5, each of the image processing apparatuses 2a, 2b, and 2c stores and manages the failure prediction list 53 in the storage device 51. Thus, each of the image processing apparatuses 2a, 2b, and 2c can grasp the rank of each of the image processing apparatuses 2a, 2b, and 2c in the failure prediction list 53. In the example of FIG. 8, the rank (overall rank) of the image processing apparatus 2b is the lowest and the rank is "1". The rank of the image processing apparatus 2c is the highest and the rank is "3". The image processing apparatus 2a is in the intermediate rank of the image processing apparatuses 2b and 2c, and the rank is "2".

Figure 9:
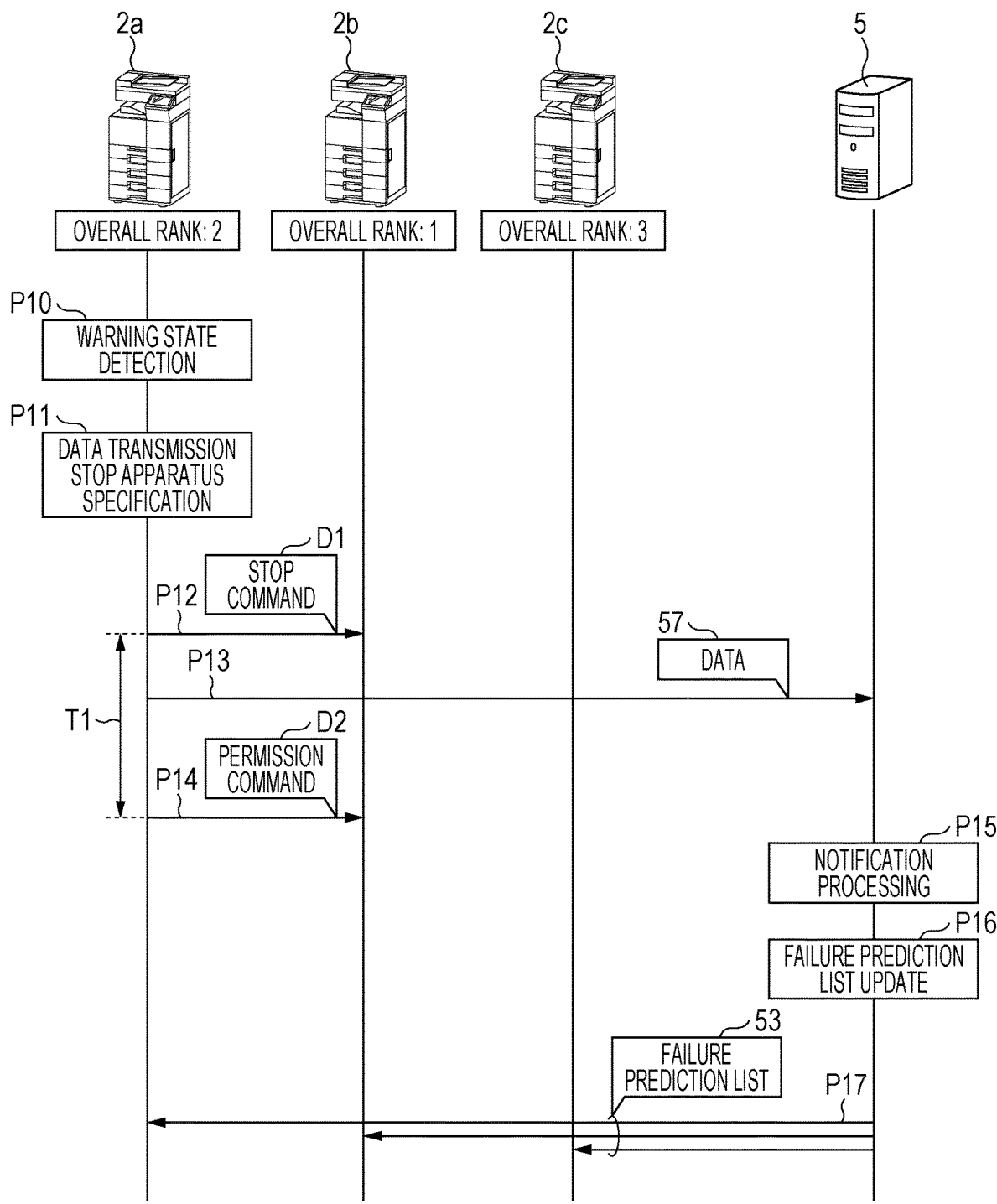
FIG. 9 is a diagram illustrating an operation example in a case where it is detected in the image processing apparatus that a component is in a warning state.

Next, FIG. 9 is a diagram illustrating an operation example in a case where it is detected in the image processing apparatus 2a that the component is in the warning state. When the ranks of the image processing apparatuses 2a, 2b, and 2c are respectively "2", "1", and "3" as described above, when the warning state of the component is detected by the image processing apparatus 2a (process P10), the image processing apparatus 2a refers to the failure prediction list 53, thereby specifying the data transmission stop apparatus that is to be caused to stop data transmission to the server 5 from among the other image processing apparatuses 2b and 2c (process P11). For example, the image processing apparatus 2a specifies, as the data transmission stop apparatus, the other image processing apparatus 2b whose rank is lower than that of the image processing apparatus 2 in the failure prediction list 53. Upon specifying the data transmission stop apparatus, the image processing apparatus 2a transmits a stop command D1 to the other image processing apparatus 2b that is the data transmission stop apparatus (process P12). Thus, the image processing apparatus 2b enters a state in which data transmission to the server 5 is not performed. In that state, the image processing apparatus 2a transmits to the server 5 the data 57 indicating that the component has entered the warning state (process P13).

When the transmission of the data 57 to the server 5 is completed, the image processing apparatus 2a transmits a permission command D2 to the other image processing apparatus 2b to which the stop command D1 is transmitted (process P14). Thus, the image processing apparatus 2b enters a state in which the data 57 can be transmitted to the server 5. Therefore, the image processing apparatus 2a can efficiently transmit the data 57 of the image processing apparatus 2a to the server 5 without conflict with the data transmission by the image processing apparatus 2b during a period from the transmission of the stop command D1 to the transmission of the permission command D2.

On the other hand, upon receiving the data 57 from the image processing apparatus 2a, the server 5 performs notification processing to the notification server 6 (process P15). Thus, processing for dispatching the maintenance inspector 7 is performed by the notification server 6. The server 5 updates the failure prediction list 53, based on the data 57 received from the image processing apparatus 2a (process P16), and transmits the failure prediction list 53 updated to each of the plurality of image processing apparatuses 2a, 2b, and 2c (process P17). Thus, each of the image processing apparatuses 2a, 2b, and 2c updates the failure prediction list 53 stored in each of the image processing apparatuses 2a, 2b, and 2c.

Figure 10:
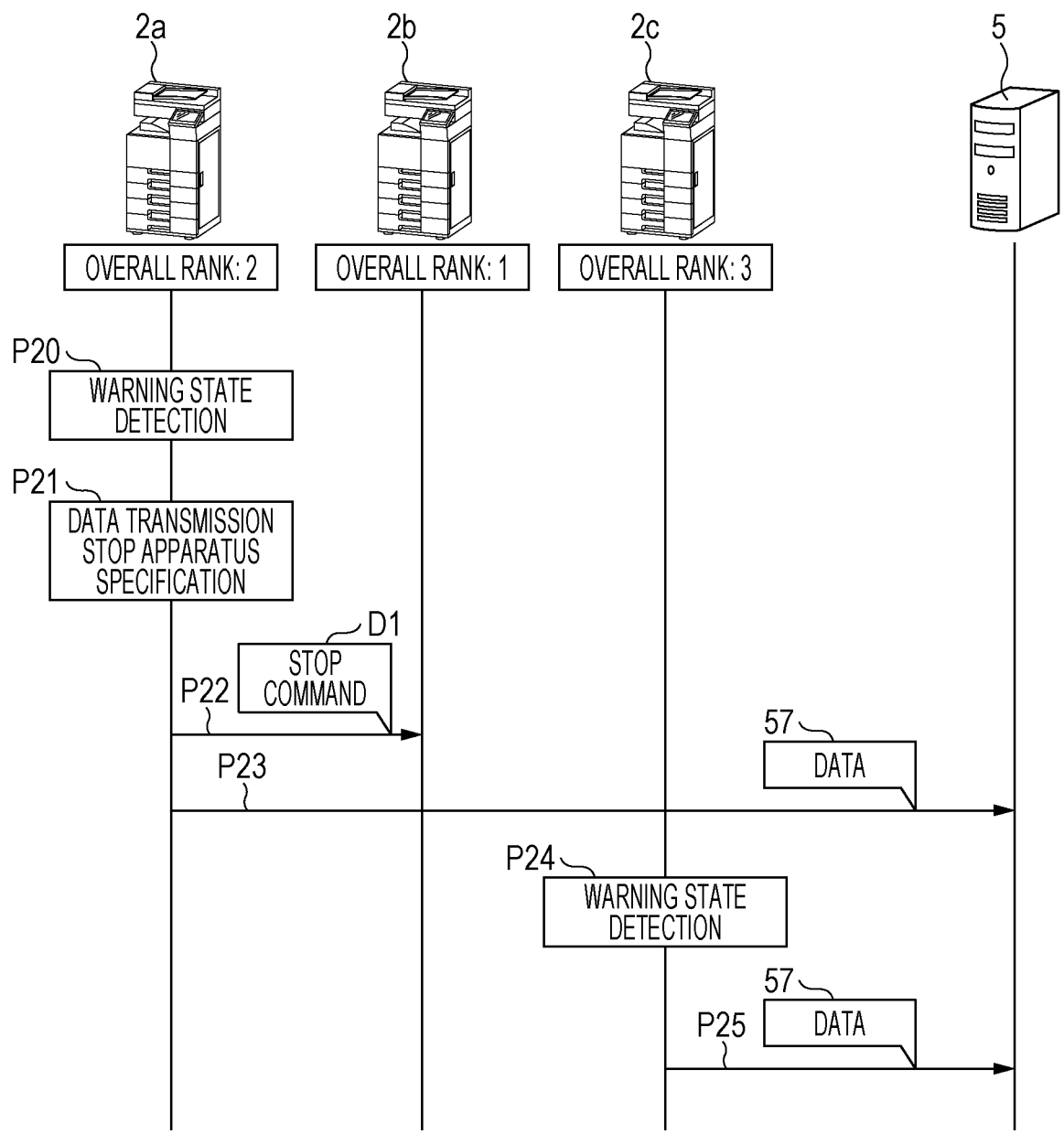
FIG. 10 is a diagram illustrating an operation example in a case where the warning state of the component is detected in the plurality of image processing apparatuses.

Next, FIG. 10 is a diagram illustrating an operation example in a case where the warning state of the component is detected in the image processing apparatus 2a and the warning state of the component is also detected in the image processing apparatus 2c. When the ranks of the image processing apparatuses 2a, 2b, and 2c are respectively "2", "1", and "3" as described above, when the warning state of the component is detected by the image processing apparatus 2a (process P20), the image processing apparatus 2a specifies the image processing apparatus 2b as the data transmission stop apparatus (process P21), and transmits the stop command D1 to the image processing apparatus 2b (process P22). Then, the image processing apparatus 2a starts transmission of the data 57 to the server 5 (process P23).

Thereafter, when the data transmission of the image processing apparatus 2a is not completed, the warning state of the component is detected in the other image processing apparatus 2c (process P24). The other image processing apparatus 2c is an apparatus whose rank is higher than that of the image processing apparatus 2a, and has been predicted in advance as having a high possibility of failure. For that reason, the stop command D1 is not transmitted from the image processing apparatus 2a to the image processing apparatus 2c, and the image processing apparatus 2c is in a state in which data transmission can be performed at the timing at which it is detected that the component is in the warning state. For that reason, the image processing apparatus 2c detecting that the component is in the warning state starts transmission of the data 57 indicating that the component is in the warning state to the server 5 (process P25). Therefore, the image processing apparatus 2c whose rank is higher than the ranks of the other image processing apparatuses 2a and 2b in the failure prediction list 53, can preferentially transmit the data 57 to the server 5 regardless of situations of the other image processing apparatuses 2a and 2b.

As illustrated in FIG. 10, when the image processing apparatus 2c starts data transmission, since the two image processing apparatuses 2a and 2c simultaneously transmits the data 57 to the server 5, the load increases a little on the server 5. To prevent this, it is more preferable to adopt an operation example illustrated in FIG. 11 below.

Figure 11:
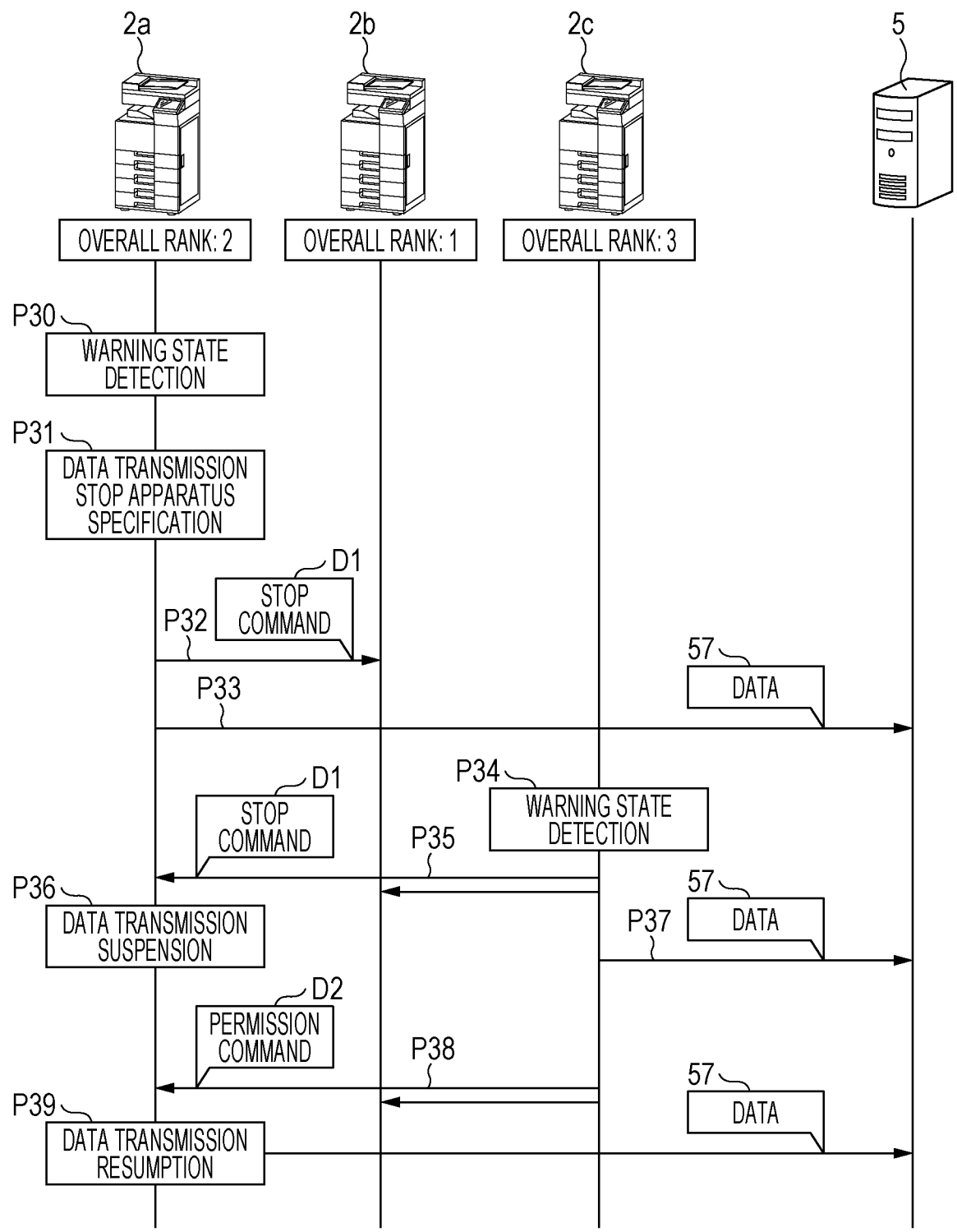
FIG. 11 is a diagram illustrating another operation example in the case where the warning state of the component is detected in the plurality of image processing apparatuses.

FIG. 11 is a diagram illustrating another operation example in the case where the warning state of the component is detected in the image processing apparatus 2a and the warning state of the component is also detected in the image processing apparatus 2c. When the ranks of the image processing apparatuses 2a, 2b, and 2c are respectively "2", "1", and "3" as described above, when the warning state of the component is detected by the image processing apparatus 2a (process P30), the image processing apparatus 2a specifies the image processing apparatus 2b as the data transmission stop apparatus (process P31), and transmits the stop command D1 to the image processing apparatus 2b (process P32). Then, the image processing apparatus 2a starts transmission of the data 57 to the server 5 (process P33).

Thereafter, when the data transmission of the image processing apparatus 2a is not completed, the warning state of the component is detected in the other image processing apparatus 2c (process P34). The image processing apparatus 2c is a data transmission priority apparatus whose rank is higher than the ranks of the image processing apparatuses 2a and 2*b*. For that reason, the image processing apparatus 2*c* specifies the image processing apparatuses 2*a* and 2*b* as the data transmission stop apparatuses, and transmits the stop command D1 to the image processing apparatuses 2*a* and 2*b* (process P35). At this time, the image processing apparatus 2*a* suspends data transmission in a state in which data transmission to the server 5 is not completed (process P36). Then, the image processing apparatus 2*c* starts data transmission to the server 5 (process P37). At this time, since the data transmission by the image processing apparatus 2*a* is stopped, the image processing apparatus 2*c* can efficiently transmit the data 57 to the server 5. When the data transmission to the server 5 is completed, the image processing apparatus 2*c* transmits the permission command D2 to the image processing apparatuses 2*a* and 2*b* (process P38).

Upon receiving the permission command D2 from the image processing apparatus 2*c*, the image processing apparatus 2*a* resumes the data transmission to the server 5 (process P39). At this time, the image processing apparatus 2*a* only needs to resume the transmission of the data 57 from the middle suspended. When the data transmission to the server 5 is completed, the image processing apparatus 2*a* transmits the permission command D2 to the image processing apparatus 2*b*.

As described above, when the data transmission priority apparatus whose rank is higher than that of the image processing apparatus 2 has reached the warning state, the image processing apparatus 2*a* suspends data transmission to the server 5, and resumes the data transmission to the server 5 after the data transmission priority apparatus completes data transmission to the server 5. By adopting such an operation example, it is possible to prevent occurrence of a state in which the two image processing apparatuses 2*a* and 2*c* simultaneously perform data transmission to the server 5. For that reason, it is possible to suppress an increase in the load on the server 5.

In the operation example described above, in a case where the warning state occurs in the image processing apparatus 2 of a lower rank when the image processing apparatus 2 of a higher rank is transmitting data, the image processing apparatus 2 of the lower rank cannot promptly perform data transmission. In particular, in a case where a job is being executed in the image processing apparatus 2 of the lower rank when the image processing apparatus 2 of the higher rank is performing data transmission, the image processing apparatus 2 of the lower rank may enter the warning state due to the execution of the job. The fact that the image processing apparatus 2 of the lower rank enters the warning state means that the image processing apparatus 2 of the lower rank is frequently used by the user. In a case where the image processing apparatus 2 whose frequency of use by the user is high enters the warning state, it is preferable that data transmission to the server 5 can be promptly started. Even in a case where the image processing apparatus 2 of the higher rank specifies the image processing apparatus 2 of the lower rank as the data transmission stop apparatus, in a case where the data transmission stop apparatus is executing a job and there is a possibility that the data transmission stop apparatus enters the warning state due to the job, it is therefore preferable that the image processing apparatus 2 does not transmit the stop command D1 to the data transmission stop apparatus.

Figure 12:
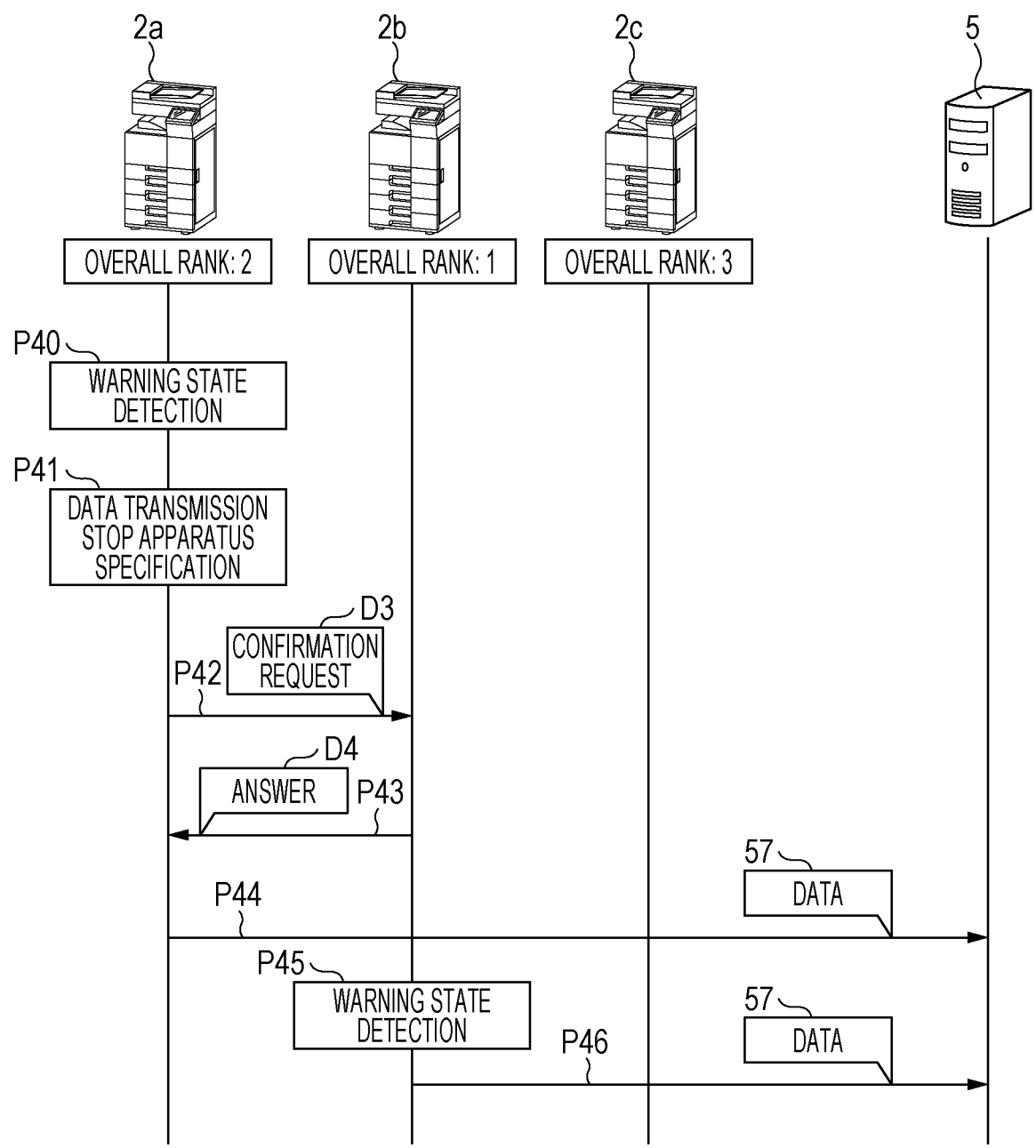
FIG. 12 is a diagram illustrating an operation example in a case where the image processing apparatus does not transmit a stop command to a data transmission stop apparatus.

FIG. 12 is a diagram illustrating an operation example in a case where the image processing apparatus 2*a* does not transmit the stop command D1 to the data transmission stop apparatus. When the ranks of the image processing apparatuses 2*a*, 2*b*, and 2*c* are respectively "2", "1", and "3" as described above, when the warning state of the component is detected by the image processing apparatus 2*a* (process P40), the image processing apparatus 2*a* specifies the image processing apparatus 2*b* as the data transmission stop apparatus (process P41). Upon specifying the data transmission stop apparatus, the image processing apparatus 2*a* causes the stop command transmission unit 66 to function. The stop command transmission unit 66 does not immediately transmit the stop command D1, but first transmits a confirmation request D3 for confirming the operation state to the image processing apparatus 2*b* that is the data transmission stop apparatus (process P42). Upon receiving the confirmation request D3, the image processing apparatus 2*b* transmits an answer D4 indicating an operation state of the image processing apparatus 2*b* to the image processing apparatus 2*a* (process P43). The answer D4 includes information indicating an operation state of the image processing apparatus 2*b*. For example, in a case where the image processing apparatus 2*b* is executing a job, the answer D4 includes detailed information relating to the job and information relating to a possibility that the component enters the warning state during the execution or after the end of the execution of the job. For that reason, upon receiving the answer D4, the stop command transmission unit 66 analyzes the answer D4, thereby being able to discriminate that the image processing apparatus 2*b* is executing the job and there is the possibility that the component enters the warning state due to the job.

In a case where the image processing apparatus 2*b* is executing the job and there is the possibility that the component enters the warning state due to the job, the stop command transmission unit 66 does not transmit the stop command D1 to the image processing apparatus 2*b* specified as the data transmission stop apparatus. Then, the data transmission unit 67 functions in the image processing apparatus 2*a*. When it is found that the stop command D1 is not transmitted by the stop command transmission unit 66, the data transmission unit 67 starts data transmission to the server 5 at that timing (process P44). Thus, the data 57 is transmitted from the image processing apparatus 2*a* to the server 5. When the warning state is detected in the image processing apparatus 2*b* in a state in which the data transmission has not ended (process P45), the image processing apparatus 2*b* starts data transmission to the server 5 (process P46). That is, since the image processing apparatus 2*b* has not received the stop command D1 from the image processing apparatus 2*a*, it is possible to transmit the data 57 to the server 5 at the timing at which the warning state is detected. As a result, in a case where the image processing apparatus 2*b* whose frequency of use by the user is high enters the warning state, it becomes possible to promptly start the data transmission to the server 5.

In the case of the operation example illustrated in FIG. 12, since the two image processing apparatuses 2*a* and 2*b* simultaneously transmits the data 57 to the server 5, the load increases a little on the server 5. To prevent this, it is more preferable to adopt an operation example illustrated in FIG. 13 below.

Figure 13:
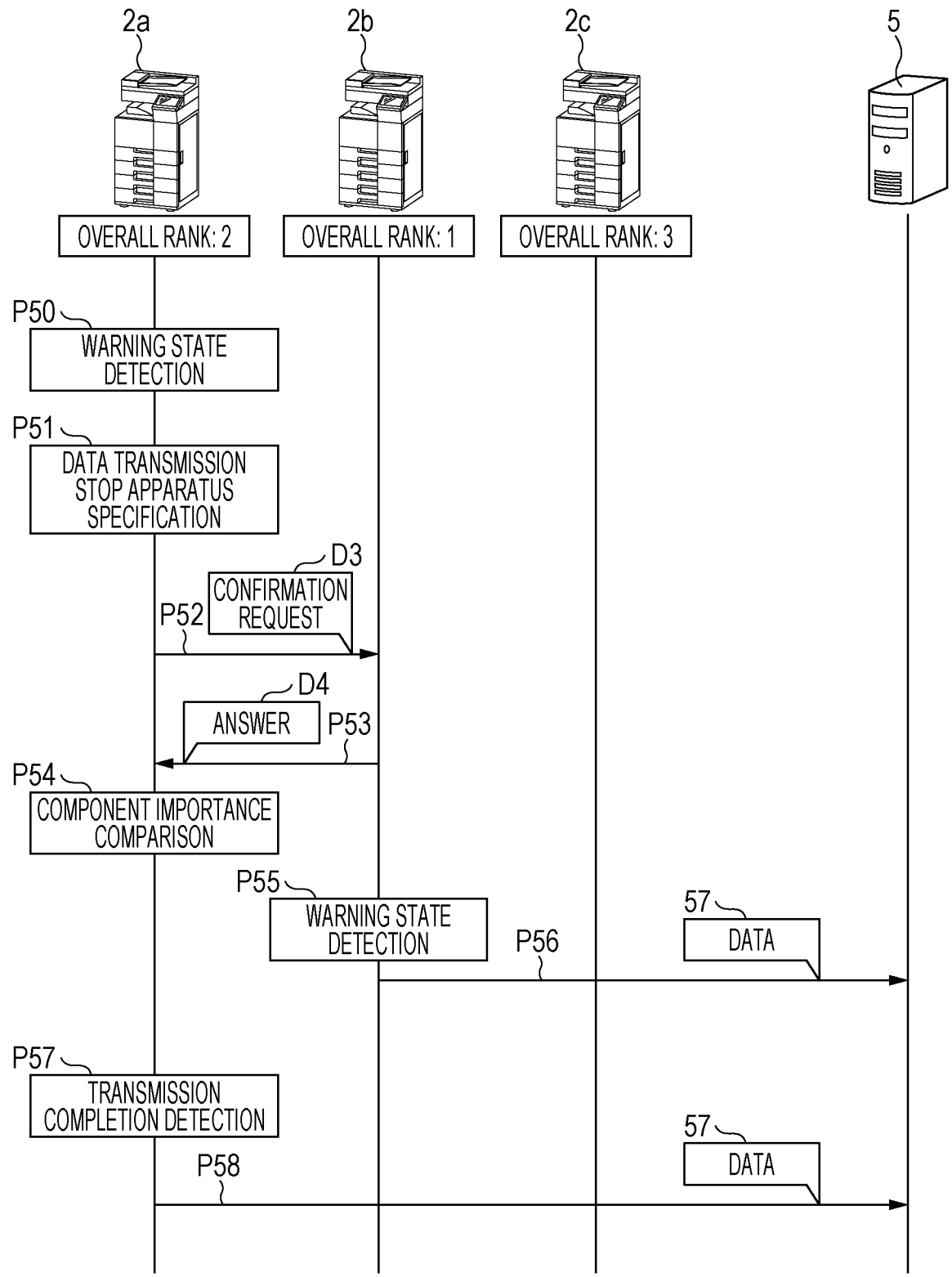
FIG. 13 is a diagram illustrating another operation example in the case where the warning state of the component is detected in the plurality of image processing apparatuses.

FIG. 13 is a diagram illustrating another operation example in a case where the warning state of the component is detected in the image processing apparatus 2*a* and the warning state of the component is also detected in the image processing apparatus 2*b*. When the ranks of the image processing apparatuses 2*a*, 2*b*, and 2*c* are respectively "2", "1", and "3" as described above, when the warning state of the component is detected by the image processing apparatus 2*a* (process P50), the image processing apparatus 2*a* specifies the image processing apparatus 2*b* as the data transmission stop apparatus (process P51). Then, before transmitting the stop command D1 to the image processing apparatus 2b, the image processing apparatus 2a first transmits the confirmation request D3 (process P52), and receives the answer D4 from the image processing apparatus 2b (process P53). Then, based on the answer D4 from the image processing apparatus 2b, the image processing apparatus 2a judges whether or not the image processing apparatus 2b is executing a job and there is a possibility that a component enters the warning state due to the job. In a case where the image processing apparatus 2b is executing the job and there is the possibility that the component enters the warning state due to the job, the image processing apparatus 2a further specifies the component that may enter the warning state in the image processing apparatus 2b. Then, the image processing apparatus 2a compares a degree of importance of the component having entered the warning state in the image processing apparatus 2a with a degree of importance of the component that may enter the warning state in the image processing apparatus 2b (process P54).

FIG. 14 is a diagram illustrating an example of component importance information 81 to be referred to for judging the degree of importance of the component. The component importance information 81 is, for example, information that is acquired in advance from the server 5 and stored in the storage device 51 of the image processing apparatus 2. As illustrated in FIG. 14, the component importance information 81 is information in which a component name 81a of a component mounted on the image processing apparatus 2 and importance 81b of each component are associated with each other. For example, in the component importance information 81, a degree of importance is "high" of a component that causes a job not to be executed when the component fails and requires a relatively long time for maintenance work for component replacement. In addition, a degree of importance is "medium" of a component that causes a job not to be executed when the component fails and requires a relatively short time for maintenance work for component replacement. Further, a degree of importance is "small" of a component that causes a job not to be executed when the component fails but can be easily replaced by the user oneself. By referring to the component importance information 81 as illustrated in FIG. 14, the image processing apparatus 2a compares the degree of importance of the component having entered the warning state in the image processing apparatus 2a with the degree of importance of the component that may enter the warning state in the image processing apparatus 2b. Note that, by referring to the component importance information 81 also in creating the failure prediction list 53 in the server 5, it is possible to decide the overall rank depending on the degree of importance of the component.

As a result of comparing the degrees of importance of the components with each other, in a case where the degree of importance of the component that may enter the warning state in the image processing apparatus 2b is higher, the image processing apparatus 2a does not transmit the stop command D1 to the image processing apparatus 2b that is the data transmission stop apparatus. Then, the image processing apparatus 2a does not start data transmission to the server 5, and waits.

On the other hand, when the image processing apparatus 2b detects the warning state of the component during the execution or after the end of the execution of the job (process P55), the image processing apparatus 2b starts data transmission to the server 5 (process P56). That is, since the image processing apparatus 2b has not received the stop command D1 from the image processing apparatus 2a, it is possible to transmit the data 57 to the server 5 at the timing at which the warning state is detected. As a result, in a case where the component whose importance is high enters the warning state in the image processing apparatus 2b whose frequency of use by the user is high, it becomes possible to promptly transmit the data 57 to the server 5. In addition, at this time, since the image processing apparatus 2a does not perform data transmission, and waits, the image processing apparatus 2b can efficiently transmit the data 57 without burdening the server 5.

When data transmission by the image processing apparatus 2b is started, the image processing apparatus 2a waits until the data transmission is completed. Then, upon detecting completion of the data transmission by the image processing apparatus 2b (process P57), the image processing apparatus 2a starts data transmission to the server 5 (process P58).

By adopting the operation example as described above, it is possible to prevent a state in which the two image processing apparatuses 2a and 2b simultaneously perform data transmission to the server 5. For that reason, it is possible to suppress an increase in the load on the server 5.

Figure 15:
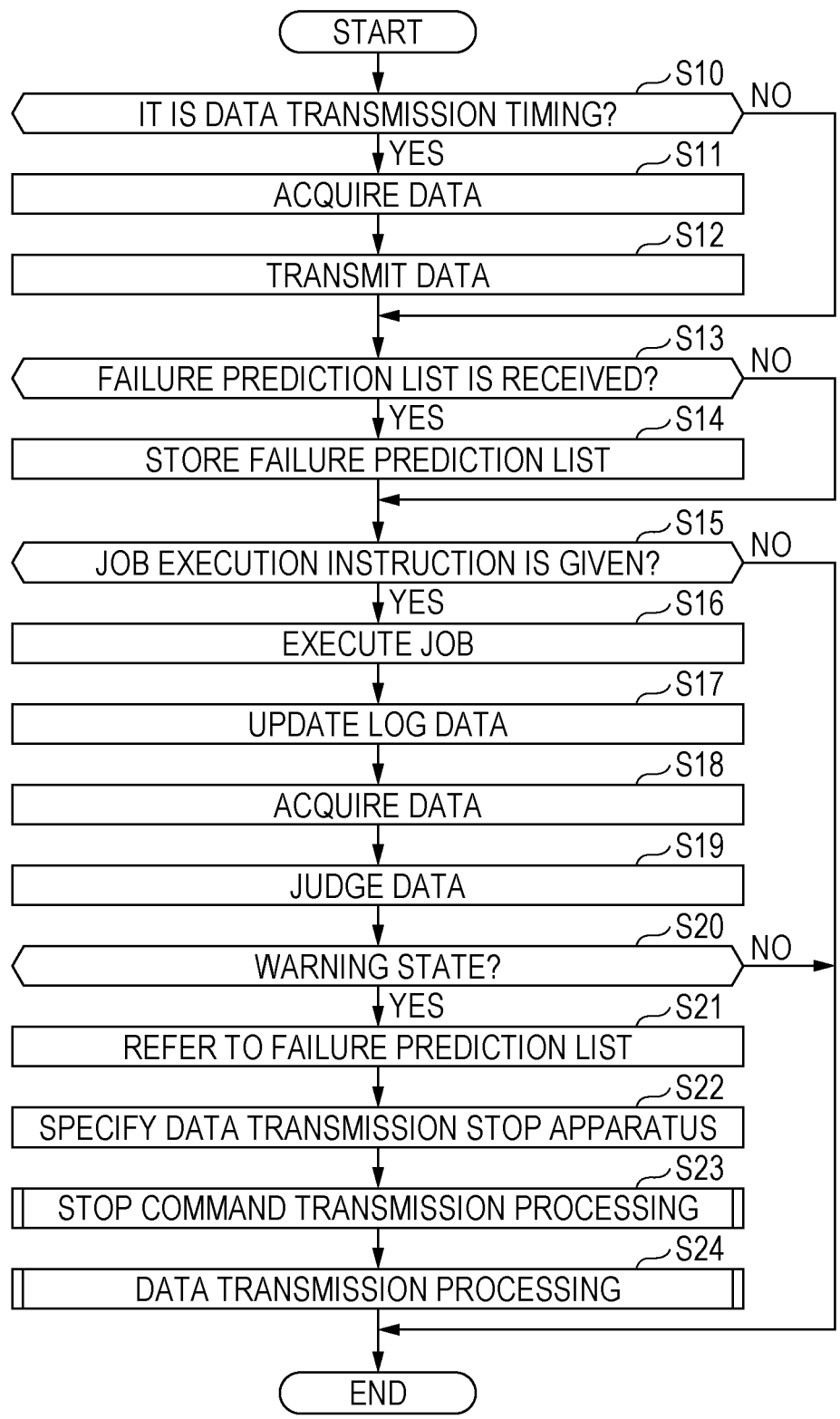
FIG. 15 is a flowchart illustrating an example of a main processing procedure performed in the image processing apparatus.
Figure 16:
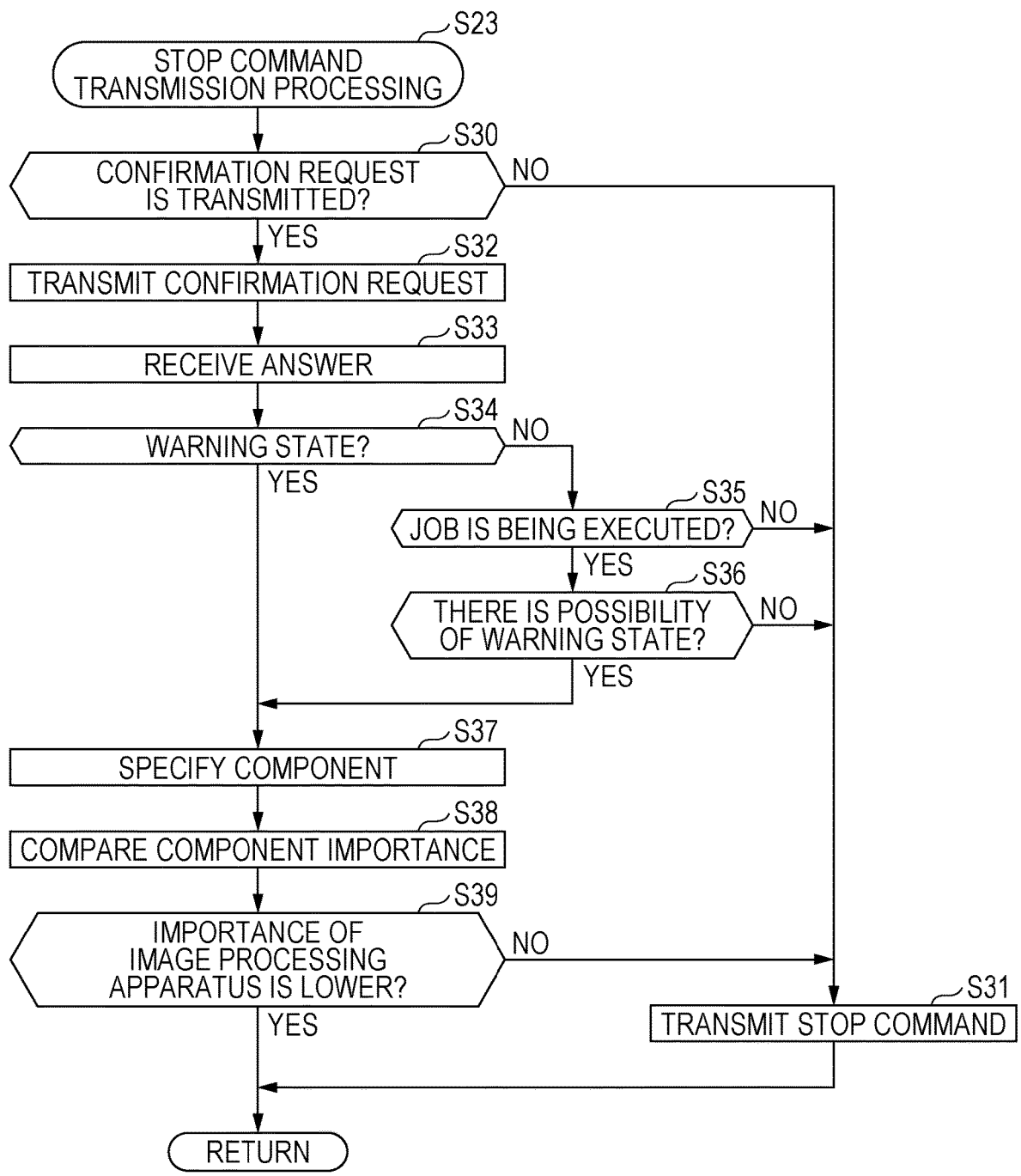
FIG. 16 is a flowchart illustrating an example of a detailed processing procedure of stop command transmission processing.
Figure 17:
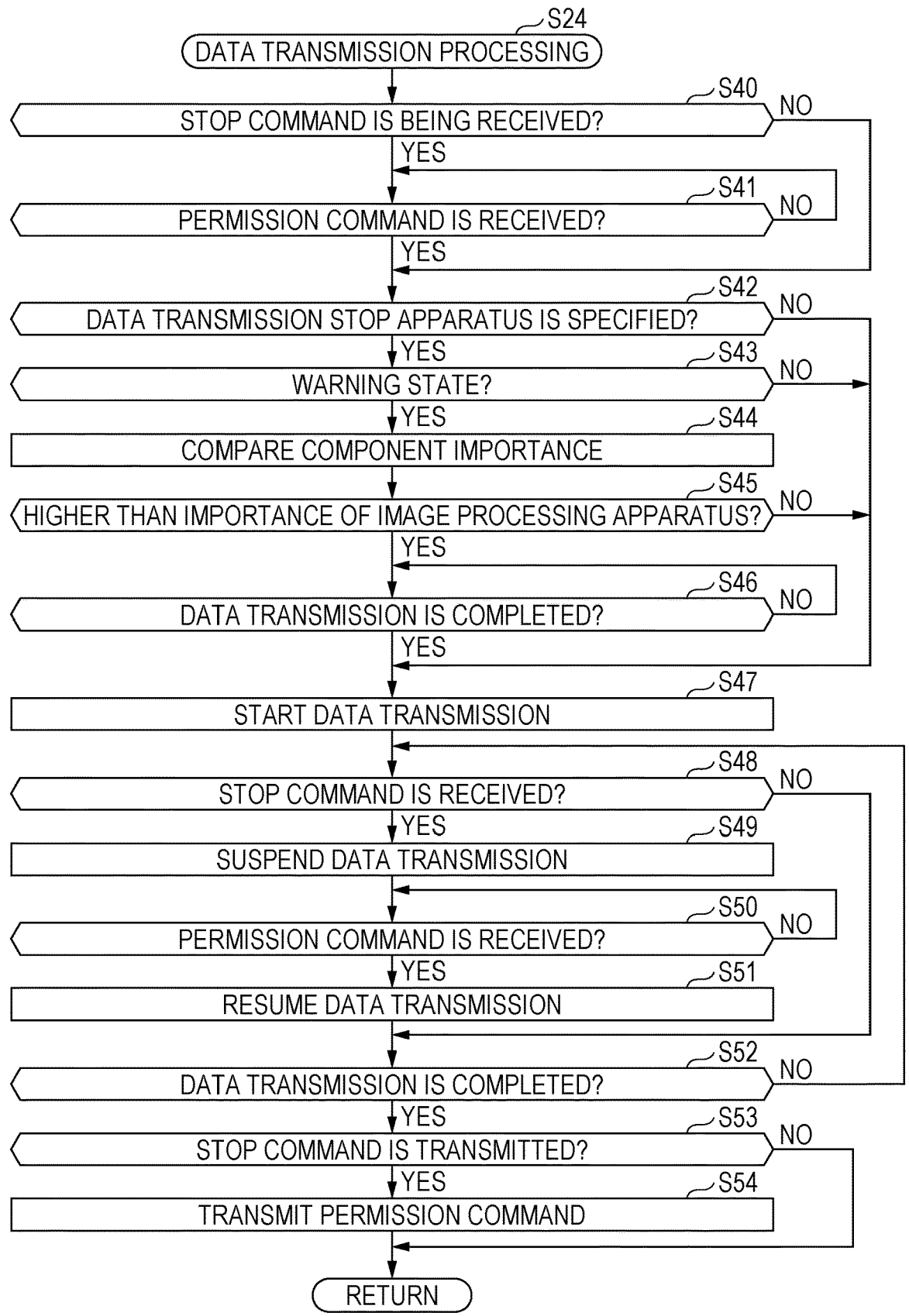
FIG. 17 is a flowchart illustrating an example of a detailed processing procedure of data transmission processing.

Next, an example will be described of an operation procedure performed in the image processing apparatus 2. FIGS. 15 to 17 are flowcharts illustrating an example of a processing procedure performed in the image processing apparatus 2. This processing is performed, for example, by the CPU 50a of the image processing apparatus 2 executing the program 52, and is repeatedly executed at predetermined time intervals in the image processing apparatus 2.

Upon starting this processing, the image processing apparatus 2 first determines whether or not it is a data transmission timing for performing regular transmission to the server 5 (step S10). In a case where it is the data transmission timing (YES in step S10), the image processing apparatus 2 acquires the data 57 from the inside of the apparatus main body (step S11), and transmits the data 57 to the server 5 (step S12). Note that, in a case where it is not the data transmission timing (NO in step S10), steps S11 and S12 are skipped.

Next, the image processing apparatus 2 determines whether or not the failure prediction list 53 is received from the server 5 (step S13). When the failure prediction list 53 is received (YES in step S13), the image processing apparatus 2 stores the failure prediction list 53 received in the storage device 51 (step S14). Note that in a case where the failure prediction list 53 is not received (NO in step S13), the processing of step S14 is skipped.

Next, the image processing apparatus 2 determines whether or not a job execution instruction is given by the user (step S15). Here, not only a user's instruction to the operation panel 8, but also a case of receiving a job via the network interface 49, for example, is determined as YES. When the job execution instruction is given by the user (YES in step S15), the image processing apparatus 2 executes the job (step S16). For example, in the case of a print job, the image processing apparatus 2 executes the print job by operating the sheet feeding unit 13 and the printer unit 12. In the case of a scan job, the image processing apparatus 2 executes the scan job by operating the ADF 11 and the scanner unit 10.

Upon execution of the job, the image processing apparatus 2 records the execution history of the job in the log data 54 and updates the log data 54 (step S17). Subsequently, the image processing apparatus 2 acquires the data 57 from the inside of the apparatus main body (step S18), and judges the data 57 (step S19). That is, the image processing apparatus 2 analyzes the data 57 varying with execution of the job, thereby determining whether or not the component inside the apparatus has entered the warning state (step S20). As a result, in a case where there is no component having entered the warning state (NO in step S20), the processing by the image processing apparatus 2 ends. On the other hand, in a case where there is a component having entered the warning state (YES in step S20), for transmitting to the server 5 the data 57 indicating that the component enters the warning state, the processing by the image processing apparatus 2 proceeds to the next step.

In a case where there is the component having entered the warning state (YES in step S20), the image processing apparatus 2 first refers to the failure prediction list 53 (step S21) and specifies the data transmission stop apparatus (step S22). Then, the image processing apparatus 2 sequentially executes stop command transmission processing (step S23) and data transmission processing (step S24).

FIG. 16 is a flowchart illustrating an example of a detailed processing procedure of the stop command transmission processing (step S23). Upon starting this processing, the image processing apparatus 2 first determines whether or not to transmit the confirmation request D3 to the data transmission stop apparatus (step S30). Whether or not to transmit the confirmation request D3 to the data transmission stop apparatus is set in advance by the user in the image processing apparatus 2. For that reason, the image processing apparatus 2 refers to a set value set by the user, thereby determining whether or not to transmit the confirmation request D3. In a case where it is set not to transmit the confirmation request D3 (NO in step S30), the image processing apparatus 2 transmits the stop command D1 to the other image processing apparatus 2 specified as the data transmission stop apparatus (step S31).

On the other hand, in a case where it is set to transmit the confirmation request D3 (YES in step S30), the image processing apparatus 2 transmits the confirmation request D3 to the other image processing apparatus 2 specified as the data transmission stop apparatus (step S32). Upon transmitting the confirmation request D3, the image processing apparatus 2 receives the answer D4 from the other image processing apparatus 2 (step S33). Upon receiving the answer D4, the image processing apparatus 2 determines whether or not a component has already reached the warning state in the other image processing apparatus 2, based on information included in the answer D4 (step S34). When the component is not yet in the warning state in the other image processing apparatus 2 (NO in step S34), the image processing apparatus 2 determines whether or not the other image processing apparatus 2 is executing a job (step S35). As a result, in a case where the other image processing apparatus 2 is not executing the job (NO in step S35), the image processing apparatus 2 transmits the stop command D1 to the other image processing apparatus 2 (step S31). In a case where the other image processing apparatus 2 is executing the job (YES in step S35), the image processing apparatus 2 further determines whether or not there is a possibility that the component enters the warning state during the execution or at the end of the execution of the job (step S36). In a case where there is no possibility that the other image processing apparatus 2 enters the warning state during the execution or at the end of the execution of the job (NO in step S36), the image processing apparatus 2 transmits the stop command D1 to the other image processing apparatus 2 (step S31).

In a case where the component has already reached the warning state in the other image processing apparatus 2 (YES in step S34), the image processing apparatus 2 specifies the component having entered the warning state in the other image processing apparatus 2 (step S37). In addition, also in a case where the other image processing apparatus 2 is executing the job and there is a possibility that the component enters the warning state due to the execution of the job (YES in step S36), the image processing apparatus 2 specifies the component that may enter the warning state in the other image processing apparatus 2 (step S37). Then, the image processing apparatus 2 compares the degree of importance of the component having entered the warning state in the image processing apparatus 2 with the degree of importance of the component having entered the warning state in the other image processing apparatus 2 or the component that may enter the warning state (step S38). As a result, in a case where the degree of importance of the component in the image processing apparatus 2 is lower (YES in step S39), the image processing apparatus 2 does not transmit the stop command D1 to the other image processing apparatus 2, and ends the processing. On the other hand, in a case where the degree of importance of the component in the image processing apparatus 2 is higher (NO in step S39), the image processing apparatus 2 transmits the stop command D1 to the other image processing apparatus 2 (step S31), and ends the processing.

In the flowchart of FIG. 16, an example has been described in which in a case where the component has already reached the warning state in the other image processing apparatus 2 (YES in step S34), the stop command D1 is not transmitted on condition that the degree of importance of the component having entered the warning state in the image processing apparatus 2 is lower than the degree of importance of the component having already entered the warning state in the other image processing apparatus 2. However, this is not a limitation. For example, if the component has already reached the warning state in the other image processing apparatus 2, there is a possibility that the other image processing apparatus 2 has started data transmission to the server 5 earlier. For that reason, to prioritize the data transmission of the other image processing apparatus 2, the image processing apparatus 2 may transmit no stop command D1 unconditionally.

Next, FIG. 17 is a flowchart illustrating an example of a detailed processing procedure of the data transmission processing (step S24). Upon starting this processing, the image processing apparatus 2 determines whether or not the stop command D1 is received from the other image processing apparatus 2 (step S40). In a case where the stop command D1 is received (YES in step S40), the image processing apparatus 2 waits until the permission command D2 is received from the other image processing apparatus 2 that is a transmission source of the stop command D1 (step S41). Note that, in a case where the stop command D1 is not received (NO in step S40), the processing of step S41 is skipped.

Next, the image processing apparatus 2 determines whether or not the other image processing apparatus 2 is specified as the data transmission stop apparatus (step S42). In a case where the other image processing apparatus 2 is specified as the data transmission stop apparatus (YES in step S42), the image processing apparatus 2 determines whether or not the component mounted in the other image processing apparatus 2 is in the warning state, or there is a possibility that the component enters the warning state (step S43). In a case where the component is in the warning state or there is the possibility that the component enters the warning state (YES in step S43), the image processing apparatus 2 compares the degree of importance of the component having entered the warning state in the image processing apparatus 2 with the degree of importance of the component that has entered the warning state or may enter the waring state in the other image processing apparatus 2 (step S44). Then, the image processing apparatus 2 determines whether or not the degree of importance of the component of the other image processing apparatus 2 is higher than the degree of importance of the component of the image processing apparatus 2 (step S45). As a result, in a case where the degree of importance of the component of the other image processing apparatus 2 is higher (YES in step S45), the image processing apparatus 2 waits until the data transmission of the other image processing apparatus 2 is completed (step S46). Note that, in a case where the degree of importance of the component of the image processing apparatus 2 is higher (NO in step S45), the processing of step S46 is skipped. In addition, in a case where the other image processing apparatus 2 is not specified as the data transmission stop apparatus (NO in step S42), or in a case where there is no component that is in the warning state or may enter the warning state in the other image processing apparatus 2 specified as the data transmission stop apparatus (NO in step S43), the processing of steps S44 to S46 is skipped.

Subsequently, the image processing apparatus 2 starts data transmission to the server 5 (step S47). Thus, the data 57 is transmitted to the server 5 from the image processing apparatus 2 detecting that the component is in the warning state. Upon starting transmission of the data 57, the image processing apparatus 2 determines whether or not the stop command D1 is received from the other image processing apparatus 2 (step S48). In a case where the stop command D1 is received (YES in step S48), the image processing apparatus 2 suspends the data transmission (step S49). Thereafter, the image processing apparatus 2 waits until the permission command D2 is received from the other image processing apparatus 2 (step S50). Upon receiving the permission command D2 (YES in step S50), the image processing apparatus 2 resumes the data transmission to the server 5 (step S51). Note that, in a case where the stop command D1 is not received (NO in step S48), the processing in steps S49 to S51 is skipped.

Then, the image processing apparatus 2 determines whether or not the data transmission to the server 5 is completed (step S52). If the data transmission is not yet completed (NO in step S52), the processing by the image processing apparatus 2 returns to step S48, and the processing described above is repeated. On the other hand, when the data transmission is completed (YES in step S52), the image processing apparatus 2 determines whether or not the stop command D1 is transmitted to the other image processing apparatus 2 (step S53). In a case where the stop command D1 is transmitted to the other image processing apparatus 2 (YES in step S53), the image processing apparatus 2 transmits the permission command D2 to the other image processing apparatuses 2 to which the stop command D1 is transmitted (step S54). Thus, the other image processing apparatus 2 enters a state in which the data 57 can be transmitted to the server 5. Note that, in a case where the stop command D1 is not transmitted to the other image processing apparatus 2, the processing of step S54 is skipped. Thus, all processing steps by the image processing apparatus 2 end.

In the flowchart described above, also when the data transmission in step S12 is performed, if the stop command D1 is received from the other image processing apparatus 2, it is more preferable to wait until the permission command D2 is received.

The image processing apparatus 2 performs the processing as described above, thereby being able to reduce a possibility that data transmission is simultaneously performed with the other image processing apparatus 2 when the component of the image processing apparatus 2 enters the warning state and the data 57 is transmitted to the server 5. For that reason, it is possible to suppress that the data transmission concentrates in the server 5 at a time, and it becomes possible to reduce the load on the server 5.

In particular, the image processing apparatus 2 acquires from the server 5 the failure prediction list 53 in which the plurality of image processing apparatuses 2 is ranked in order from the one whose possibility of failure is higher, or in order from the one whose replacement time of the component is closer, and in a case where the component of the image processing apparatus 2 enters the warning state, refers to the failure prediction list 53 and suppresses that data transmission is performed from the other image processing apparatus 2 whose rank is lower than that of the image processing apparatus 2. For that reason, basically, the image processing apparatus 2 can transmit the data 57 to the server 5 in a state in which data transmission is not performed from the other image processing apparatus 2 whose rank is lower than that of the image processing apparatus 2, and can efficiently perform the data transmission without increasing the load on the server 5.

The image processing apparatus 2 refers to the failure prediction list 53, thereby specifying, as the data transmission priority apparatus, the other image processing apparatus 2 whose rank is higher than that of the image processing apparatus 2, and in a case where the data transmission priority apparatus has reached the warning state, suspends the data transmission of the image processing apparatus 2. For that reason, the other image processing apparatus 2 whose rank is higher than that of the image processing apparatus 2 is enabled to notify the server 5 that the warning state has occurred preferentially than the image processing apparatus 2. At this time, the other image processing apparatus 2 can efficiently perform the data transmission without increasing the load on the server 5.

The embodiment related to the present invention has been described above; however, the present invention is not limited to the contents described in the above embodiment, and various modifications are applicable.

For example, when the data transmission unit 67 transmits the data 57 to the server 5, only data varying from the previous data 57 may be extracted and transmitted to the server 5.

In the above embodiment, a case has been exemplified where the image processing apparatus 2 includes the MFP, and has the plurality of functions such as the scan function, the print function, and the copy function. However, the image processing apparatus 2 is not necessarily limited to the one having the plurality of functions such as the scan function, the print function, and the copy function. For example, the image processing apparatus 2 may be a scanner having only the scanning function, or a printer having only the print function. The image processing apparatus 2 may be provided with image processing functions other than the scan function and the print function.

In the above embodiment, a case has been exemplified where the program 52 executed by the CPU 50*a* is installed in advance in the image processing apparatus 2. However, the program 52 is not limited to the one installed in advance in the image processing apparatus 2, and may be a target of transactions alone. In that case, the program 52 may be provided to the image processing apparatus 2 in a form of being downloaded by the user oneself via the Internet or the like, or may be provided to the image processing apparatus 2 in a state of being recorded in a computer-readable recording medium such as a CD-ROM or a USB memory. The same applies to the program 59 stored in the server 5.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus that transmits data relating to an internal component to a server, the image processing apparatus comprising
    a hardware processor that:
        acquires from the server a failure prediction list in which a plurality of image processing apparatuses is ranked;
        detects that the internal component has reached a warning state;
        specifies one of the plurality of image processing apparatuses other than the image processing apparatus to be a data transmission stop apparatus, wherein the specified image processing apparatus causes data transmission to the server from among other image processing apparatuses to be stopped, the hardware processor specifies the one image processing apparatus by referring to the failure prediction list in a case where it is detected that the internal component has reached the warning state;
        transmits a stop command for causing the data transmission to the server to be stopped to the data transmission stop apparatus specified; and
        transmits, to the server, data relating to the internal component detected as being in the warning state.

2. The image processing apparatus according to claim 1, wherein the data relating to the internal component includes data that varies with execution of a job.

3. The image processing apparatus according to claim 1, wherein the data relating to the internal component includes at least one of sensor data output from a sensor that monitors an operation state of the internal component, counter data to be incremented with execution of a job, or log data indicating an execution history of the job.

4. The image processing apparatus according to claim 1, wherein the hardware processor refers to the failure prediction list, and specifies, as the data transmission stop apparatus, another image processing apparatus whose rank is lower than that of the image processing apparatus.

5. The image processing apparatus according to claim 1, wherein
    the hardware processor specifies, as a data transmission priority apparatus, another image processing apparatus whose rank is higher than that of the image processing apparatus by referring to the failure prediction list in a case where it is detected that the internal component has reached the warning state, and
    the hardware processor suspends the data transmission to the server in a case where the data transmission priority apparatus has reached the warning state.

6. The image processing apparatus according to claim 5, wherein the hardware processor resumes the data transmission to the server after the data transmission priority apparatus completes data transmission to the server.

7. The image processing apparatus according to claim 1, wherein the hardware processor, after completing the data transmission to the server, transmits to the data transmission stop apparatus a permission command for permitting data transmission to the server.

8. The image processing apparatus according to claim 1, wherein the failure prediction list is a list in which the plurality of image processing apparatuses is ranked based on a degree of arrival at a replacement time of an internal component mounted in each of the plurality of image processing apparatuses.

9. The image processing apparatus according to claim 1, wherein the hardware processor detects that the internal component has reached the warning state before an abnormality occurs in the internal component.

10. The image processing apparatus according to claim 1, wherein the hardware processor does not transmit the stop command to the data transmission stop apparatus in a case where the data transmission stop apparatus specified is executing a job and there is a possibility that the data transmission stop apparatus specified enters the warning state due to the job.

11. The image processing apparatus according to claim 1, wherein the hardware processor does not transmit the stop command to the data transmission stop apparatus in a case where the data transmission stop apparatus specified has reached the warning state.

12. The image processing apparatus according to claim 11, wherein the hardware processor suspends the data transmission to the server in a case where a degree of importance of an internal component having reached the warning state in the data transmission stop apparatus is higher than a degree of importance of an internal component having reached the warning state in the image processing apparatus.

13. A server that collects data relating to an internal component from each of a plurality of image processing apparatuses, the server comprising
    a hardware processor that:
        creates a failure prediction list in which the plurality of image processing apparatuses is ranked;
        transmits the failure prediction list to each of the plurality of image processing apparatuses; and
        receives data transmitted from each of the plurality of image processing apparatuses, wherein
    the hardware processor updates the failure prediction list with reception of the data, and
    the hardware processor transmits the failure prediction list to each of the plurality of image processing apparatuses each time the failure prediction list is updated.

14. The server according to claim 13, wherein the hardware processor, based on the data received, judges a degree of arrival at a replacement time of an internal component mounted in each of the plurality of image processing apparatuses and ranks the plurality of image processing apparatuses.

15. The server according to claim 13, wherein the hardware processor decides a rank of each of the plurality of image processing apparatuses depending on a number of times of abnormality occurrence of an internal component mounted in each of the plurality of image processing apparatuses.

16. A non-transitory recording medium storing a computer readable program executed in an image processing apparatus that transmits data relating to an internal component to a server, the computer readable program causing the image processing apparatus to perform:

acquiring from the server a failure prediction list in which a plurality of image processing apparatuses is ranked;

detecting that the internal component has reached a warning state;

specifying one of the plurality of image processing apparatuses other than the image processing apparatus to be a data transmission stop apparatus, wherein the specified image processing apparatus causes that is to be caused to stop data transmission to the server from among other image processing apparatuses to be stopped, the hardware processor specifies the one image processing apparatus by referring to the failure prediction list in a case where it is detected that the internal component has reached the warning state;

transmitting a stop command for causing the data transmission to the server to be stopped to the data transmission stop apparatus specified by the specifying; and transmitting, to the server, data relating to the internal component detected by the detecting as being in the warning state.

17. A non-transitory recording medium storing a computer readable program executed in a server that collects data relating to an internal component from each of a plurality of image processing apparatuses, the computer readable program causing the server to perform:

creating a failure prediction list in which the plurality of image processing apparatuses is ranked;

transmitting the failure prediction list to each of the plurality of image processing apparatuses; and receiving data transmitted from each of the plurality of image processing apparatuses, wherein the creating updates the failure prediction list with reception of the data in the receiving, and the transmitting transmits the failure prediction list to each of the plurality of image processing apparatuses each time the failure prediction list is updated.

* * * * *